(12) United States Patent  
Sawachi

(10) Patent No.: US 7,796,239 B2  
(45) Date of Patent: Sep. 14, 2010

(54) RANGING APPARATUS AND RANGING METHOD

(75) Inventor: Youichi Sawachi, Kawaguchi (JP)

(73) Assignee: FUJIFILM Corporation, Tokyo (JP)

( * ) Notice: Subject to any disclaimer, the term of this patent is extended or adjusted under 35 U.S.C. 154(b) by 343 days.

(21) Appl. No.: 12/053,568

(22) Filed: Mar. 22, 2008

(65) Prior Publication Data

US 2008/0231832 A1   Sep. 25, 2008

(30) Foreign Application Priority Data

Mar. 23, 2007   (JP) ............................. 2007-077872

(51) Int. Cl.
*G01C 3/08* (2006.01)
(52) U.S. Cl. .................... 356/5.1; 356/5.01; 356/5.05
(58) Field of Classification Search ............. 356/4.01, 356/5.01, 5.05, 5.1, 5.15
See application file for complete search history.

(56) References Cited

U.S. PATENT DOCUMENTS

| | | | | |
|---|---|---|---|---|
| 5,708,860 A | * | 1/1998 | Nonaka et al. ................ | 396/28 |
| 5,886,777 A | * | 3/1999 | Hirunuma .................. | 356/5.12 |
| 6,122,040 A | * | 9/2000 | Arita et al. ................. | 356/4.01 |
| 7,095,487 B2 | * | 8/2006 | Gonzalez-Banos et al. . | 356/4.07 |
| 7,508,443 B2 | * | 3/2009 | Kato .......................... | 348/371 |
| 7,554,652 B1 | * | 6/2009 | Babin et al. ................ | 356/5.03 |
| 7,561,255 B1 | * | 7/2009 | Billmers et al. ............ | 356/5.04 |
| 2007/0127009 A1 | * | 6/2007 | Chen et al. ................... | 356/5.1 |

FOREIGN PATENT DOCUMENTS

JP     2006105694 A     4/2006

* cited by examiner

*Primary Examiner*—Isam Alsomiri
(74) *Attorney, Agent, or Firm*—Sughrue Mion, PLLC

(57) ABSTRACT

A first ranging apparatus includes a light emitter for emitting a modulated light which is intensity-modulated, a light detector for detecting a reflected light from an object that is irradiated with the modulated light, a distance calculator for calculating the distance up to the object based on the phase difference between the modulated light and the reflected light, and a gate controller. The gate controller outputs gate pulses to control a light emission controller to intermittently emit the modulated light to the object and also control an electrooptical shutter or an electronic shutter of an image capturing device to intermittently detect the reflected light from the object based on the intermittent emission of the modulated light.

20 Claims, 19 Drawing Sheets

STORED ELECTRIC CHARGE

STORED ELECTRIC CHARGE (ELECTRIC CHARGE TRANSFER)

(ELECTRIC CHARGE TRANSFER)

RANGING APPARATUS AND RANGING METHOD

BACKGROUND OF THE INVENTION

1. Field of the Invention

The present invention relates to a ranging apparatus and a ranging method, and more particularly to a ranging apparatus and a ranging method for detecting the phase delay of reflected light from an object that is irradiated with modulated light at each of the pixels of an image capturing device, for thereby detecting a three-dimensional structure of the object.

2. Description of the Related Art

One known process for measuring the distance up to an object is an optical TOF (Time Of Flight) ranging process.

As shown in FIG. 18 of the accompanying drawings, a ranging apparatus based on the optical TOF ranging process comprises a light source 200 in the form of an LED array, for example, for emitting intensity-modulated light (modulated light), an image capturing device 204 for detecting reflected light from an object 202 irradiated with the modulated light from the light source 200, and an optical system 206 for focusing the reflected light onto the image capturing device 204.

If the modulated light emitted from the light source 200 and applied to the object 202 is intensity-modulated, for example, at a high frequency of 20 MHz, then the modulated light has a wavelength of 15 m. When the modulated light travels back and forth over a distance of 7.5 m, the modulated light as it is detected by the image capturing device 204 has undergone a phase delay of one cycle length.

The phase delay that the reflected light undergoes with respect to the modulated light will be described below with reference to FIG. 19 of the accompanying drawings.

As shown in FIG. 19, a reflected light R has a phase delay of $\phi$ with respect to a modulated light W. In order to detect the phase delay of $\phi$, the reflected light R is sampled at four equal intervals, for example, in one cyclic period of the modulated light W. If the sampled amplitudes of the reflected light R at respective phases of 0°, 90°, 180°, 270°, for example, of the modulated light W are represented by A0, A1, A2, A3, respectively, then the phase delay of $\phi$ is expressed by the following equation:

$$\phi = \arctan\{(A3-A1)/(A0-A2)\}$$

The reflected light from the object 202 is focused onto the light-detecting surface of the image capturing device 204 by the optical system 206. The light-detecting surface of the image capturing device 204 comprises a two-dimensional matrix of pixels (photodiodes). When the phase delay of $\phi$ is determined at each of the pixels according to the above equation, a three-dimensional structure of the object 202 can be detected.

A ranging apparatus based on the above principle is disclosed in Japanese Laid-Open Patent Publication No. 2006-105694, for example.

In order to avoid a detection error caused by reflected light (delayed reflected light) which has reached the image capturing device with a delay greater than one cyclic period of the modulated light, the disclosed ranging apparatus does not employ those pixels which have detected amounts of light equal to or lower than a preset threshold value. In other words, the disclosed ranging apparatus is unable to calculate distance values for the pixels which have detected the delayed reflected light, among all the pixels of the image capturing device.

SUMMARY OF THE INVENTION

It is an object of the present invention to provide a ranging apparatus and a ranging method which are capable of accurately measuring the distance up to an object even if reflected light (delayed reflected light) from the object has reached an image capturing device with a delay greater than one cyclic period of modulated light from the emission of the modulated light, for thereby increasing the accuracy of the ranging process.

According to a first aspect of the present invention, there is provided a ranging apparatus comprising a light-emitting unit for emitting a modulated light which is intensity-modulated, a light-detecting unit for detecting a reflected light from an object that is irradiated with the modulated light, a calculating unit for calculating the distance up to the object based on the phase difference between the modulated light and the reflected light, an intermittent emission control unit for controlling the light-emitting unit to intermittently emit the modulated light to the object, and an intermittent detection control unit for controlling the light-detecting unit to intermittently detect the reflected light based on the intermittent emission of the modulated light under the control of the intermittent emission control unit, wherein the calculating unit includes a corrector for correcting the distance up to the object based on information produced by intermittently detecting the reflected light.

With the above arrangement, even if the reflected light (delayed reflected light) has reached the light-detecting unit with a delay greater than one cyclic period of the modulated light from a time when the modulated light starts being emitted, the ranging apparatus can accurately measure the distance up to the object. Therefore, the accuracy of distance measurement is increased.

In the first aspect of the present invention, the intermittent emission control unit may control the light-emitting unit to intermittently emit the modulated light to the object in every nth (n=1, 2, ...) cyclic period of the modulated light, and the intermittent detection control unit controls the light-detecting unit to intermittently detect the reflected light in every nth cyclic period of the modulated light.

The light-detecting unit may comprise an image capturing device for sampling the amount of the reflected light in exposure periods established on the basis of a constant cyclic period with respect to the time when the modulated light starts being emitted, and the intermittent detection control unit may control the image capturing device to sample the amount of the reflected light in a terminal portion of each cyclic period in the every nth cyclic period of the modulated light which is intermittently applied to the object.

The corrector may compare a sampled value in the terminal portion of each cyclic period in the every nth cyclic period with a first reference value corresponding to a distance commensurate with a ½ cyclic period of the modulated light, an (n−1)th reference value corresponding to a distance commensurate with an (n−1)/2 cyclic period of the modulated light, and an nth reference value corresponding to a distance commensurate with an n/2 cyclic period of the modulated light. If the sampled value is greater than the first reference value, the corrector may not correct the calculated distance. If the sampled value is equal to or greater than the nth reference value and equal to or smaller than the (n−1)th reference value, the corrector may add the distance commensurate with the (n−1)/2 cyclic period of the modulated light to the calculated distance. If the sampled value is smaller than the nth reference value, the corrector may add the distance commensurate with the n/2 cyclic period of the modulated light to the calculated distance.

In the first aspect of the present invention, the intermittent emission control unit may control the light-emitting unit to intermittently emit the modulated light to the object in every other cyclic period of the modulated light, and the intermittent detection control unit controls the light-detecting unit to intermittently detect the reflected light in every other cyclic period of the modulated light.

The light-detecting unit may comprise an image capturing device for sampling the amount of the reflected light in exposure periods established on the basis of a constant cyclic period with respect to the time when the modulated light starts being emitted, and the intermittent detection control unit may control the image capturing device to sample the amount of the reflected light in a terminal portion of each of cyclic periods of the modulated light which is intermittently applied to the object.

The corrector may compare a sampled value in the terminal portion of each of the cyclic periods with a reference value corresponding to a distance commensurate with a ½ cyclic period of the modulated light. If the sampled value is greater than the reference value, the corrector may not correct the calculated distance, and if the sampled value is equal to or smaller than the reference value, the corrector may add the distance commensurate with the ½ cyclic period of the modulated light to the calculated distance.

In the first aspect of the present invention, the corrector may correct the distance up to the object if the phase difference between the modulated light and the reflected light falls in a predetermined range. In particular, if the light-detecting unit comprises a plurality of light detectors, then the calculating unit may calculate distances up to the object which correspond respectively to the light detectors from phase differences between the modulated light and the reflected light which correspond respectively to the light detectors, and the corrector may correct the distance up to the object with respect to each of those of the light detectors, those of the light detectors having phase differences between the modulated light and the reflected light which fall in the predetermined range.

Since the correcting process is carried out for only those pixels which need to be corrected, the processing sequence is speeded up.

In the first aspect of the present invention, the light-detecting unit may comprise an image capturing device for sampling the amount of light detected in exposure periods established on the basis of a constant cyclic period with respect to the time when the modulated light starts being emitted, and the corrector may calculate an offset component by subtracting the total amount of the reflected light from the total amount of light detected, in a certain period, and correct the distance up to the object in view of the offset component. Accordingly, a correction error due to an ambient light component and an offset component can be reduced for higher distance measurement accuracy.

According to a second aspect of the present invention, there is provided a ranging method comprising the steps of a) emitting a modulated light which is intensity-modulated, b) detecting a reflected light from an object that is irradiated with the modulated light, c) calculating the distance up to the object based on the phase difference between the modulated light and the reflected light, d) controlling the emission of the modulated light to intermittently emit the modulated light to the object, and e) controlling the detection of the reflected light to intermittently detect the reflected light based on the intermittent emission of the modulated light in the step d), wherein the step c) comprises the step of correcting the distance up to the object based on information produced by intermittently detecting the reflected light.

With the above arrangement, even if the reflected light (delayed reflected light) has reached a light-detecting unit with a delay greater than one cyclic period of the modulated light from the time when the modulated light starts being emitted, the ranging apparatus can accurately measure the distance up to the object. Therefore, the accuracy of distance measurement is increased.

In the second aspect of the present invention, the step d) may comprise the step of controlling the emission of the modulated light to intermittently emit the modulated light to the object in every nth (n=1, 2, . . . ) cyclic period of the modulated light, and the step e) comprises the step of controlling the detection of the reflected light to intermittently detect the reflected light in every nth cyclic period of the modulated light.

The step b) may comprise the step of sampling the amount of the reflected light in exposure periods established on the basis of a constant cyclic period with respect to the time when the modulated light starts being emitted, and the step e) may sample the amount of the reflected light in a terminal portion of each cyclic period in the every nth cyclic period of the modulated light which is intermittently applied to the object.

In the step of correcting the distance up to the object, a sampled value in the terminal portion of each cyclic period in the every nth cyclic period may be compared with a first reference value corresponding to a distance commensurate with a ½ cyclic period of the modulated light, an (n−1)th reference value corresponding to a distance commensurate with an (n−1)/2 cyclic period of the modulated light, and an nth reference value corresponding to a distance commensurate with an n/2 cyclic period of the modulated light. If the sampled value is greater than the first reference value, the calculated distance up to the object may not be corrected. If the sampled value is equal to or greater than the nth reference value and equal to or smaller than the (n−1)th reference value, the distance commensurate with the (n−1)/2 cyclic period of the modulated light may be added to the calculated distance. If the sampled value is smaller than the nth reference value, the distance commensurate with the n/2 cyclic period of the modulated light may be added to the calculated distance.

In the second aspect of the present invention, the step d) may control the emission of the modulated light to intermittently emit the modulated light to the object in every other cyclic period of the modulated light, and the step e) may control the detection of the reflected light to intermittently detect the reflected light in every other cyclic period of the modulated light.

The step b) may comprise the step of sampling the amount of the reflected light in exposure periods established on the basis of a constant cyclic period with respect to the time when the modulated light starts being emitted, and the step e) may sample the amount of the reflected light in a terminal portion of each of cyclic periods of the modulated light which is intermittently applied to the object.

In the step of correcting the distance up to the object, a sampled value in the terminal portion of each of the cyclic periods may be compared with a reference value corresponding to a distance commensurate with a ½ cyclic period of the modulated light. If the sampled value is greater than the reference value, the calculated distance up to the object may not be corrected, and if the sampled value is equal to or smaller than the reference value, the distance commensurate with the ½ cyclic period of the modulated light may be added to the calculated distance.

In the second aspect of the present invention, the step of correcting the distance up to the object may correct the distance up to the object if the phase difference between the modulated light and the reflected light falls in a predetermined range. In particular, if the step b) detects the reflected light with a plurality of light detectors, then the step c) may calculate distances up to the object which correspond respectively to the light detectors from phase differences between the modulated light and the reflected light which correspond respectively to the light detectors, and the step of correcting the distance up to the object may correct the distance up to the object with respect to each of those of the light detectors, those of the light detectors having phase differences between the modulated light and the reflected light which fall in the predetermined range.

In the second aspect of the present invention, the step b) may comprise the step of sampling the amount of light detected in exposure periods established on the basis of a constant cyclic period with respect to the time when the modulated light starts being emitted, and the step of correcting the distance up to the object may calculate an offset component by subtracting the total amount of the reflected light from the total amount of light detected, in a certain period, and correct the distance up to the object in view of the offset component.

With the ranging apparatus and the ranging method according to the present invention, as described above, even if the reflected light (delayed reflected light) has reached the light-detecting unit with a delay greater than one cyclic period of the modulated light from the time when the modulated light starts being emitted, the ranging apparatus can accurately measure the distance up to the object. Therefore, the accuracy of distance measurement is increased.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
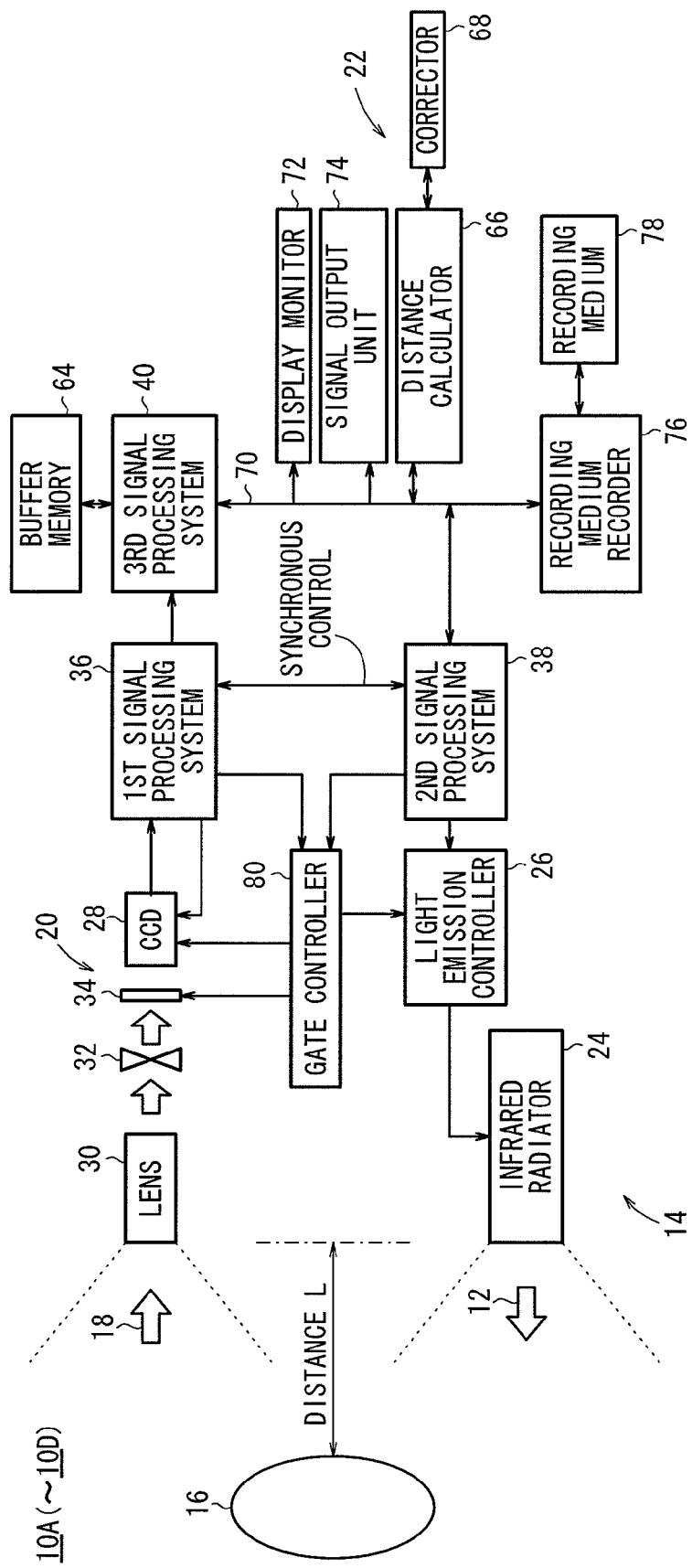
FIG. 1 is a block diagram of each of first through fourth ranging apparatus according to the present invention.

Like or corresponding parts are denoted by like or corresponding reference characters.

Ranging apparatus and ranging methods according to preferred embodiments of the present invention will be described below with reference to FIGS. 1 through 17.

As shown in FIG. 1, a ranging apparatus 10A according to a first embodiment of the present invention (hereinafter referred to as "first ranging apparatus 10A") comprises a light-emitting unit 14 for emitting a modulated light 12 which has been intensity-modulated, a light-detecting unit 20 for detecting a reflected light 18 from an object 16 which has been irradiated with the modulated light 12, and a calculating unit 22 for calculating the distance from the first ranging apparatus 10A to the object 16 based on the phase difference between the modulated light 12 and the reflected light 18.

The light-emitting unit 14 comprises a light emitter (infrared radiator) 24 and a light emission controller 26 (sine-wave generator) for controlling the light emitter 24 to intensity-modulate a light emitted from the light emitter 24 and emit it as the modulated light 12. The light emitter 24 comprises an array of LEDs. The light emission controller 26 controls the light emitter 24 to emit a light that is intensity-modulated sinusoidally, for example, as the modulated light 12. The modulated light 12 starts being emitted based on a negative-going edge, for example, of a synchronizing signal. Therefore, the negative-going edge of the synchronizing signal serves as a point of time to start emitting the modulated light 12.

The light-detecting unit 20 comprises an image capturing device 28, an optical system 30 for focusing the reflected light 18 onto the light-detecting surface of the image capturing device 28, an electrooptical shutter 32 for intermittently blocking the light that has passed through the optical system 30, and an infrared pass filter 34 for passing the infrared radiation of the light that has passed through the optical system 30, to the image capturing device 28.

The first ranging apparatus 10A also includes a first signal processing system 36, a second signal processing system 38, and a third signal processing system 40.

The first signal processing system 36 comprises a timing generator for generating various timing signals (exposure pulses, transfer pulses, readout pulses, etc.) based on the synchronizing signal, an image capturing device controller for energizing the image capturing device 28, an analog signal processor for processing an image signal from the image capturing device 28 into an analog image signal, and an A/D converter for converting the analog image signal into digital image data.

The second signal processing system 38 comprises a timing generator for controlling the light emission controller 26 based on the synchronizing signal, and a time measuring circuit for measuring an emission time of the modulated light 12, etc.

The third signal processing system 40 comprises a camera controller, an image processor, and a memory controller.

The image data generated by the first signal processing system 36 are stored in a buffer memory 64 by the memory controller of the third signal processing system 40.

The calculating unit 22 comprises a distance calculator 66 for calculating distances up to the object 16 which correspond to the respective pixels of the image capturing device 28 based on the image data stored in the buffer memory 64, and a corrector 68 for correcting the calculated distances.

The third signal processing system 40 is connected to a display monitor 72, a signal output unit 74, and a recording medium recorder 76 by a bus 70. The display monitor 72 displays distance images and grayscale images based on the image data. The signal output unit 74 outputs distance images, grayscale images, and various parameters to an external circuit. The recording medium recorder 76 records distance images, grayscale images, and various parameters in a recording medium 78.

The first ranging apparatus 10A also includes a gate controller 80 for outputting gate pulses to control the light emission controller 26 to intermittently emit the modulated light 12 from the light emitter 24 to the object 16, and also for controlling the electrooptical shutter or an electronic shutter of the image capturing device 28 to intermittently detect the reflected light 18 from the object 16 based on the intermittent emission of the modulated light 12. The gate controller 80 thus serves as both an intermittent emission control unit and an intermittent detection control unit.

In the first ranging apparatus 10A, the gate controller 80 controls, with the gate pulses output thereby, the light emission controller 26 to emit the modulated light 12 in every other cyclic period of the modulated light 12, and also controls, with the gate pulses output thereby, the electrooptical shutter or the electronic shutter of the image capturing device 28 to detect the reflected light 18 from the object 16 which has been irradiated with the modulated light 12, in every other cyclic period of the modulated light 12.

Figure 2:
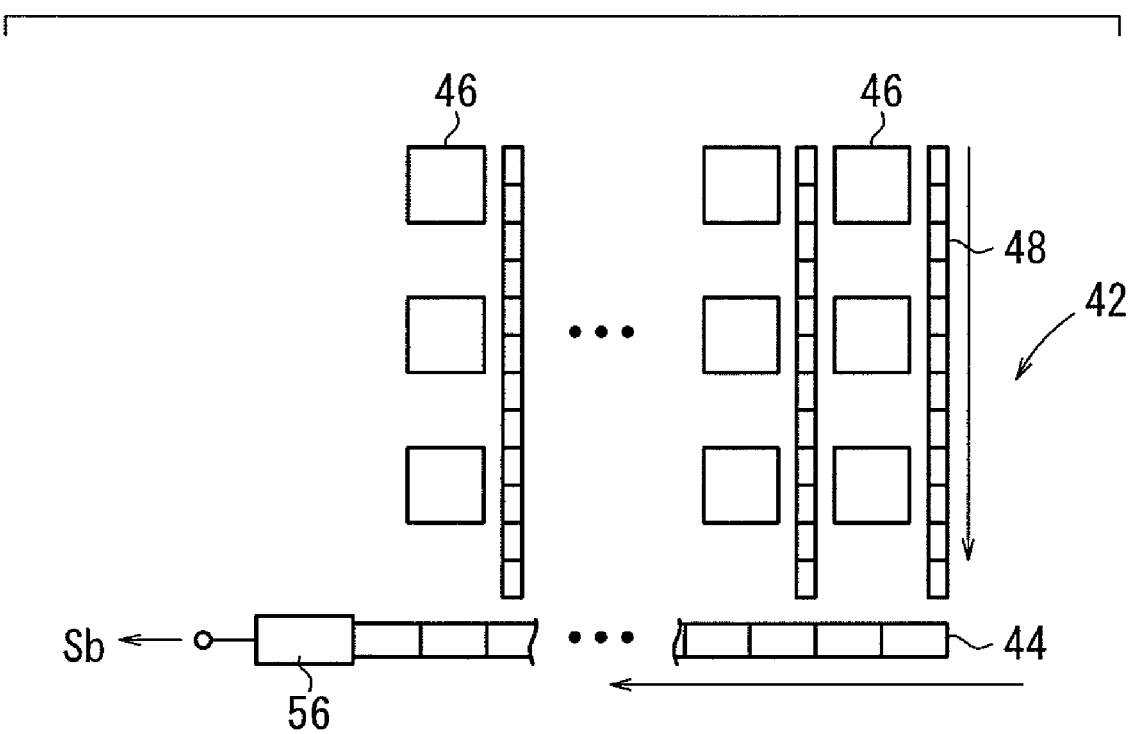
FIG. 2 is a schematic view of a general structure of an image capturing device.

As shown in FIG. 2, the image capturing device 28 comprises a light detector 42 and a horizontal transfer path 44 disposed adjacent to the light detector 42. The light detector 42 comprises a matrix of pixels (photodiodes) 46 for photoelectrically converting an amount of light applied thereto into an amount of electric charge corresponding to the applied amount of light. The image capturing device 28 also includes a plurality of vertical transfer paths 48 that are shared by respective columns of pixels 46 and spaced apart along rows of pixels 46. The horizontal transfer path 44 is shared by the vertical transfer paths 48.

Figure 3A:
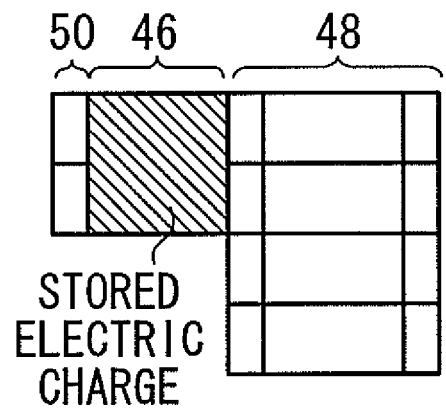
FIGS. 3A and 3B are views showing how an electric charge is stored in the image capturing device.
Figure 3B:
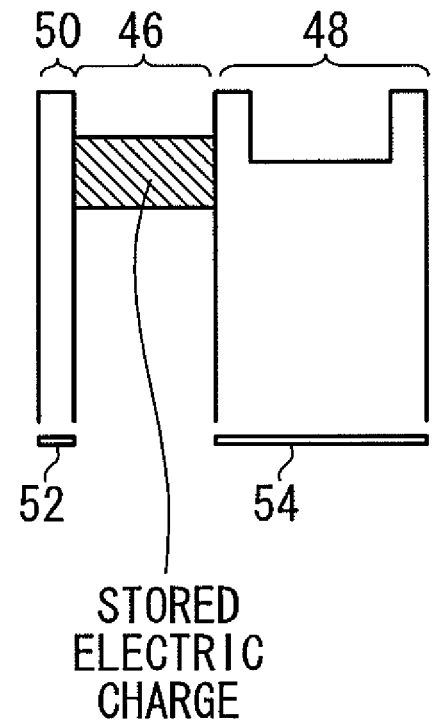

A process of reading electric charges from the pixels 46 based on the concept of frames used in the outputting of video data will be described below. As shown in FIGS. 3A and 3B, each of the pixels 46 generates an electric charge in response to a reflected light 18 applied thereto and stores the generated electric charge (exposure) in a first frame. At this time, the pixel 46 is not exposed to the reflected light 18 throughout the first frame, but is exposed to the reflected light 18 in each of exposure periods that are established at required timings. Specifically, the exposure periods are established by energizing the electrooptical shutter 32 or the electronic shutter of the image capturing device 28 based on a control signal from the first signal processing system 36. An overflow drain region 50 is disposed adjacent to each of the pixels 46. When a predetermined voltage is applied to a drain electrode 52 connected to the overflow drain region 50, the potential of the overflow drain region 50 is lowered to drain the electric charge stored in the pixel 46.

Figure 4A:
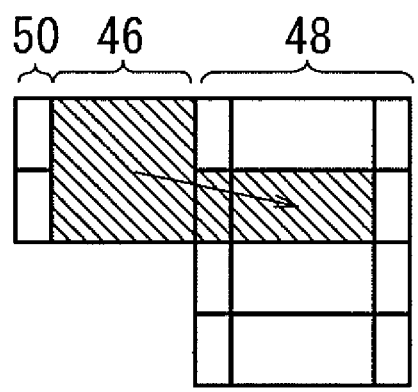
FIGS. 4A and 4B are views showing how an electric charge is transferred in the image capturing device.
Figure 4B:
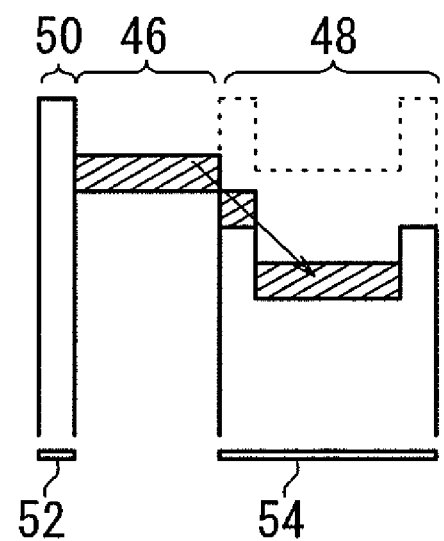

In a next second frame, the electric charge is transferred. Specifically, during a vertical blanking period, for example, of the second frame, as shown in FIGS. 4A and 4B, a predetermined voltage is applied to a vertical transfer electrode 54 corresponding to one packet of the vertical transfer path 48, thereby lowering the potential of the packet to a level lower than the potential of the pixel 46. The electric charge stored in the pixel 46 now flows into the vertical transfer path 48. Thereafter, the potential is restored, and during a horizontal blanking period, a transfer voltage is applied to the vertical transfer electrode 54 to transfer the electric charge to the horizontal transfer path 44, as shown in FIG. 2. When the electric charge is transferred to the horizontal transfer path 44, a transfer voltage is applied to a horizontal transfer electrode connected to the horizontal transfer path 44 during a horizontal scanning period, thereby transferring the electric charge along the horizontal transfer path 44 to an output circuit 56. The output circuit 56 converts the electric charge into a voltage signal depending on the amount of an electric charge, and outputs the voltage signal as a captured image signal.

The horizontal blanking period and the horizontal scanning period in the second frame are repeated to transfer a series of electric charges stored in the respective pixels 46 along the vertical transfer path 48 and the horizontal transfer path 44 to the output circuit 56, which outputs the captured image signal.

In the second frame, the pixels 46 may be or may not be exposed to the reflected light 18.

The captured image signal from the image capturing device 28 is processed into an analog image signal by the analog signal processor of the first signal processing system 36. The analog image signal is converted into digital image data by the A/D converter of the first signal processing system 36. The digital image data have a data structure comprising an array of amplitudes of the reflected light 18 that are sampled at required timings (exposure periods) and associated with the respective pixels 46.

The buffer memory 64 stores four types of image data (first through fourth image data) according to the optical TOF ranging process referred to above. The first image data has a data structure comprising an array of amplitudes S1 of the reflected light 18 that are sampled at timings when the phase of the modulated light 12 is 0°, for example, and associated with the respective pixels 46. Similarly, the second, third, and fourth image data have a data structure comprising an array of amplitudes S2, S3, S4 of the reflected light 18 that are sampled at timings when the phase of the modulated light 12 is 90°, 180°, 270°, for example, and associated with the respective pixels 46.

The distance calculator 66 calculates the distances from the respective pixels 46 to the object 16 based on the first through fourth image data.

A calculating algorithm of the distance calculator 66, particularly, a calculating algorithm for calculating the distance from one pixel 46 to the object 16 will be described below with reference to FIG. 5. If it is assumed that the modulated light 12 has its varying amplitude represented by a circle 60 with its center at the origin of a coordinate system, then the reflected light 18 has its amplitude at points P1, P2, P3, P4 when the modulated light 12 is at respective phases of 0° (360°), 90°, 180°, 270°. If the point P1 has coordinates (A, −B), then the point P2 has coordinates (B, A), the point P3 has coordinates (−A, B), and the point P4 has coordinates (−B, −A).

Figure 5:
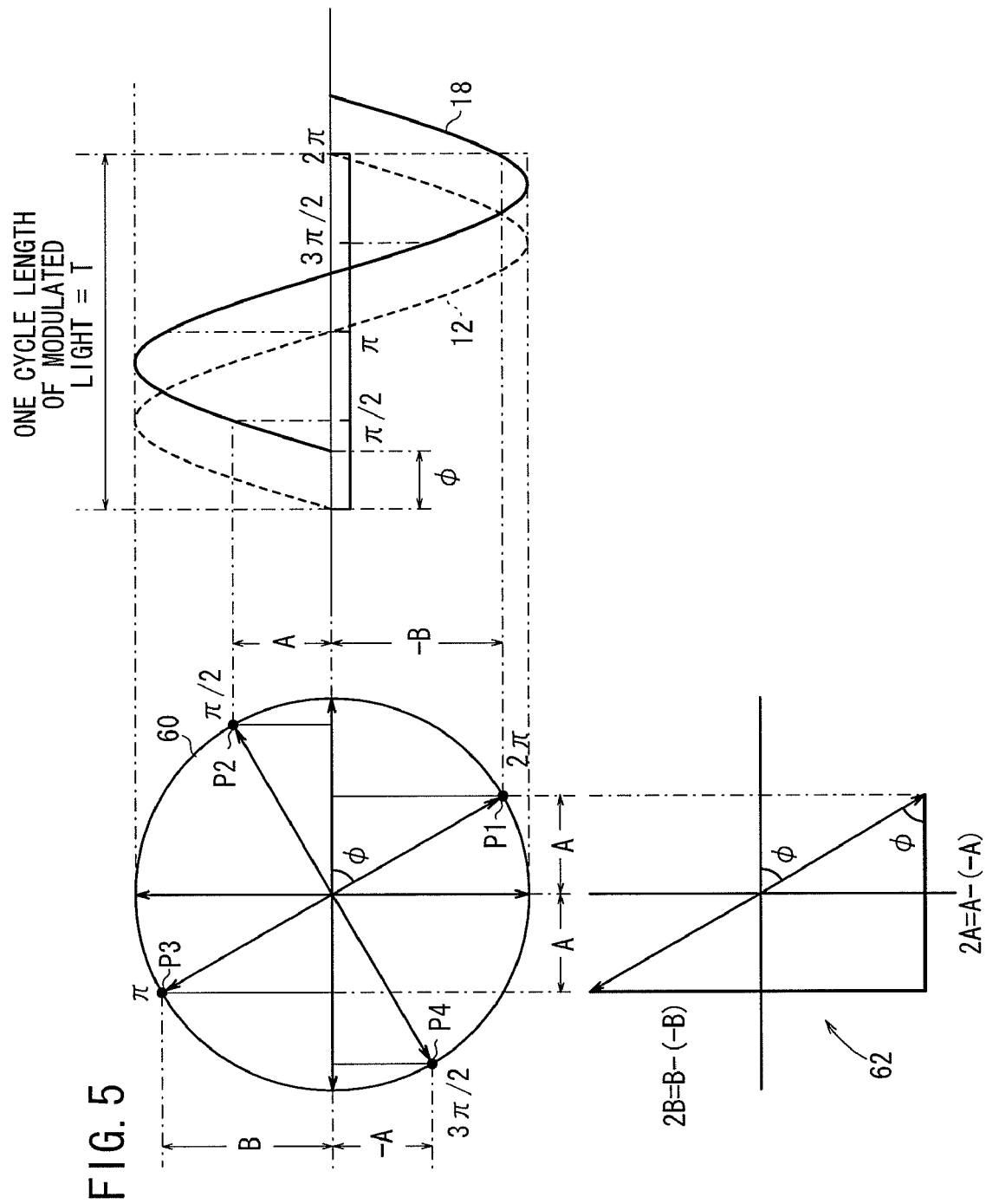
FIG. 5 is a diagram illustrative of the principle of a process for determining a phase delay of a reflected light from sampled amplitudes thereof based on a captured image signal from the image capturing device.

Since these coordinates can be converted into a rectangular triangle 62 shown in FIG. 5, the phase delay of φ of the reflected light 18 with respect to the modulated light 12 is determined by the following equation (1):

$$\phi = \arctan\{(B-(-B))/(A-(-A))\} \quad (1)$$

Since A corresponds to the sampled amplitude S2 of the second image data, −A the sampled amplitude S4 of the fourth image data, B the sampled amplitude S3 of the third image data, and −B the sampled amplitude S1 of the first image data, the equation (1) can be rewritten into the following equation (2):

$$\phi = \arctan\{(S3-S1)/(S2-S4)\} \quad (2)$$

If one cycle length of the modulated light 12 is indicated by T, then a delay time τ that is consumed after the modulated light 12 is emitted from the light emitter 24 until the reflected light 18 is detected by the image capturing device 28 is determined by the following equation:

$$\tau = T \times (\phi/2\pi)$$

The delay time τ is commensurate with twice the distance L from the first ranging apparatus 10A to the object 16 and the light travels between the ranging apparatus 10A and the object 16. Therefore, the distance L is determined by the equation:

$$L = (\tau \times c)/2$$

The distance calculator 66 has the above algorithm installed as software, and applies the algorithm to each of the pixels 46 to calculate the distance depending on each of the pixels 46 for thereby detecting the three-dimensional structure of the object 16.

A processing sequence of the first ranging apparatus 10A will be described below with reference to waveform diagrams shown in FIGS. 6 and 7 and a flowchart shown in FIG. 8.

Figure 8:
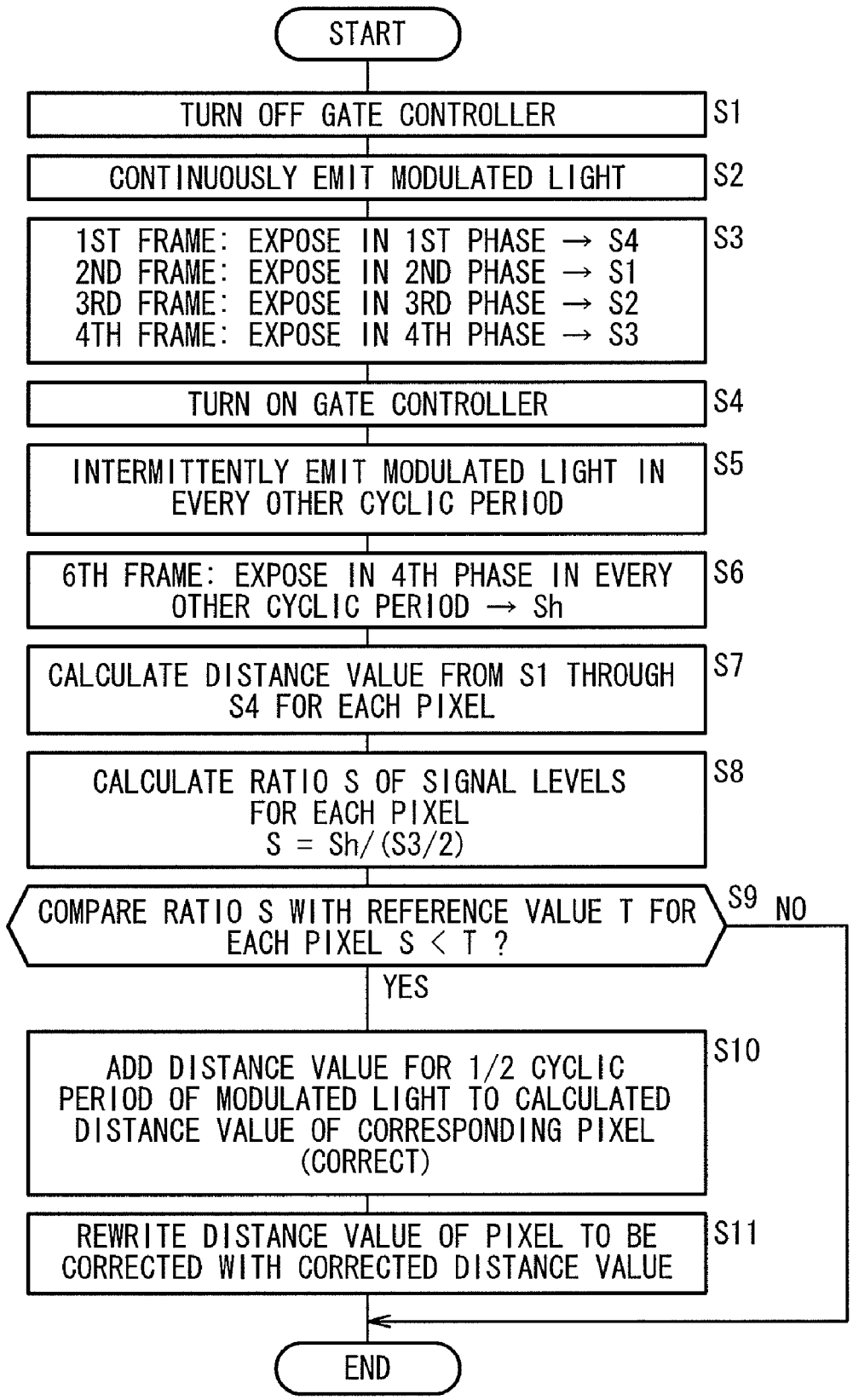
FIG. 8 is a flowchart of a processing sequence of the first ranging apparatus.

In step S1 shown in FIG. 8, the gate controller 80 is turned off to disable its intermittent control operation. In step S2, the light emitter 24 continuously emits the modulated light 12.

In step S3, the light emitter 24 emits the modulated light 12 in each of constant cyclic periods (e.g., frames), and the image capturing device 28 detects the reflected light 18 while the phase of an exposure period Tr is being shifted by a one-quarter cyclic period of the modulated light 12 in each frame.

Specifically, the light emission controller 26 controls the light emitter 24 to emit the modulated light 12 based on a synchronizing signal representing a first frame, for example. The modulated light 12 emitted from the light emitter 24 is applied to the object 16, from which the reflected light 18 is applied through the optical system 30 to the image capturing device 28. The image capturing device controller of the first signal processing system 36 controls the image capturing device 28 in order to perform an exposure process for a given period of time when the modulated light 12 reaches a first phase of 270°, for example. In the first frame, therefore, the amount of the reflected light 18 at the time when the phase of the modulated light 12 is 270° is converted into an electric charge, which is stored in the image capturing device 28.

Thereafter, the light emission controller 26 controls the light emitter 24 to emit the modulated light 12 based on a synchronizing signal representing a second frame, for example. The image capturing device controller controls the image capturing device 28 in order to perform an exposure process for a given period of time when the modulated light 12 reaches a second phase of 0°, for example. In the second frame, the amount of the reflected light 18 at the time when the phase of the modulated light 12 is 0° is converted into an electric charge, which is stored in the image capturing device 28. In the second frame, the electric charge stored in the image capturing device 28 in the first frame is transferred as an analog signal (image signal), and the analog signal is converted into a digital signal. The digital signal is saved in the buffer memory 64 as fourth image data representing a pixel-dependent array of sampled amplitudes S4 of the reflected light 18 at the time the phase of the modulated light 12 is 270°.

Thereafter, the light emission controller 26 controls the light emitter 24 to emit the modulated light 12 based on a synchronizing signal representing a third frame, for example. The image capturing device controller controls the image capturing device 28 in order to perform an exposure process for a given period of time when the modulated light 12 reaches a third phase of 90°, for example. In the third frame, the amount of the reflected light 18 at the time when the phase of the modulated light 12 is 90° is converted into an electric charge, which is stored in the image capturing device 28. In the third frame, the electric charge stored in the image capturing device 28 in the second frame is transferred as an analog signal (image signal), and the analog signal is converted into a digital signal. The digital signal is saved in the buffer memory 64 as first image data representing a pixel-dependent array of sampled amplitudes S1 of the reflected light 18 at the time when the phase of the modulated light 12 is 0°.

Thereafter, the light emission controller 26 controls the light emitter 24 to emit the modulated light 12 based on a synchronizing signal representing a fourth frame, for example. The image capturing device controller controls the image capturing device 28 so as to perform an exposure process for a given period of time when the modulated light 12 reaches a fourth phase of 180°, for example. In the fourth frame, the amount of the reflected light 18 at the time when the phase of the modulated light 12 is 180° is converted into an electric charge, which is stored in the image capturing device 28. In the fourth frame, the electric charge stored in the image capturing device 28 in the third frame is transferred as an analog signal (image signal), and the analog signal is converted into a digital signal. The digital signal is saved in the buffer memory 64 as second image data representing a pixel-dependent array of sampled amplitudes S2 of the reflected light 18 at the time when the phase of the modulated light 12 is 90°.

In a subsequent fifth frame, the electric charge stored in the image capturing device 28 in the fourth frame is transferred as an analog signal (image signal), and the analog signal is converted into a digital signal. The digital signal is saved in the buffer memory 64 as third image data representing a pixel-dependent array of sampled amplitudes S3 of the reflected light 18 at the time when the phase of the modulated light 12 is 180°.

In this stage, the buffer memory 64 has stored the four image data (the first through fourth image data) according to the TOF ranging process.

Thereafter, the gate controller 80 is turned on in step S4. In step S5, the light emission controller 26 is controlled by the gate controller 80 to emit the modulated light 12 in every other cyclic period of the modulated light 12. The modulated light 12 is intermittently emitted from the light emitter 24 in response to a synchronizing signal representing a sixth frame, for example.

In step S6, the gate controller 80 controls the electrooptical shutter 32 or the electronic shutter of the image capturing device 28 for the image capturing device 28 to detect the reflected light 18 intermittently. Specifically, the gate controller 80 controls the image capturing device 28 so as to perform an exposure process for a given period of time when the modulated light 12 reaches the fourth phase of 180°, for example. The light emitter 24 emits the modulated light 12 intermittently and the image capturing device 28 detects the reflected light 18 intermittently in synchronism with gate pulses output from the gate controller 80. Therefore, as shown in FIG. 7, the light emitter 24 does not emit the modulated light 12 and the image capturing device 28 does not detect the reflected light 18 in periods corresponding to the first, third, fifth, . . . cyclic periods of the modulated light 12 in the sixth frame, and the light emitter 24 emits the modulated light 12 and the image capturing device 28 detects the reflected light 18 in periods corresponding to the second, fourth, sixth, . . . cyclic periods of the modulated light 12 in the sixth frame. In the sixth frame, the amount of the reflected light 18 at the time when the phase of the modulated light 12 that is emitted in every other cyclic period thereof is 180°, is photoelectrically converted into an electric charge and the electric charge is stored in the image capturing device 28. Since the image capturing device 28 detects the reflected light 18 in every other cyclic period, the total exposure time of the image capturing device 28 in the sixth frame is ½ of the total exposure time in each of the first through fourth frames.

In a seventh frame, the electric charge stored in the sixth frame is transferred as an analog signal (image signal), and converted into digital data which are stored in the buffer memory 64 as corrective image data representing a pixel-dependent array of sampled corrective amplitudes Sh.

In step S7, the distance calculator 66 calculates distance values up to the object 16 which correspond to the respective pixels 46 based on the sampled amplitudes Si through S4 of the first through fourth image data. Distance image data are thus generated which have a data structure comprising an array of distance values corresponding to the respective pixels 46.

Thereafter, in step S8, the corrector 68 determines a ratio S of signal levels for each pixel from each of the sampled amplitudes S3 of the third image data and each of the sampled amplitudes Sh of the corrective image data according to the following equation (shown for one pixel):

$S = Sh/(S3/2)$

Ratio image data are thus generated which have a data structure comprising an array of ratios S of signal levels corresponding to the respective pixels 46.

The total exposure time for obtaining the corrective image data is ½ of the total exposure time for obtaining the third image data. Therefore, the sampled amplitudes S4 are reduced to ½.

In step S9, the corrector 68 compares the ratio S of signal levels for each pixel of the ratio image data with a reference value T corresponding to a distance commensurate with the ½ cyclic period of the modulated light.

The reference value T is determined as follows: If the distance up to the object 16 is equal to or greater than the distance commensurate with the ½ cyclic period of the modulated light 12, then since no reflected light comes within the emission period of the modulated light 12, almost no electric charge is stored in the image capturing device 28. Therefore, the ratio S of signal levels is essentially nil. Though the reference value T should ideally be nil, it is actually set to 0.05 or the like in view of residual smearing, ambient light, etc.

Figure 6:
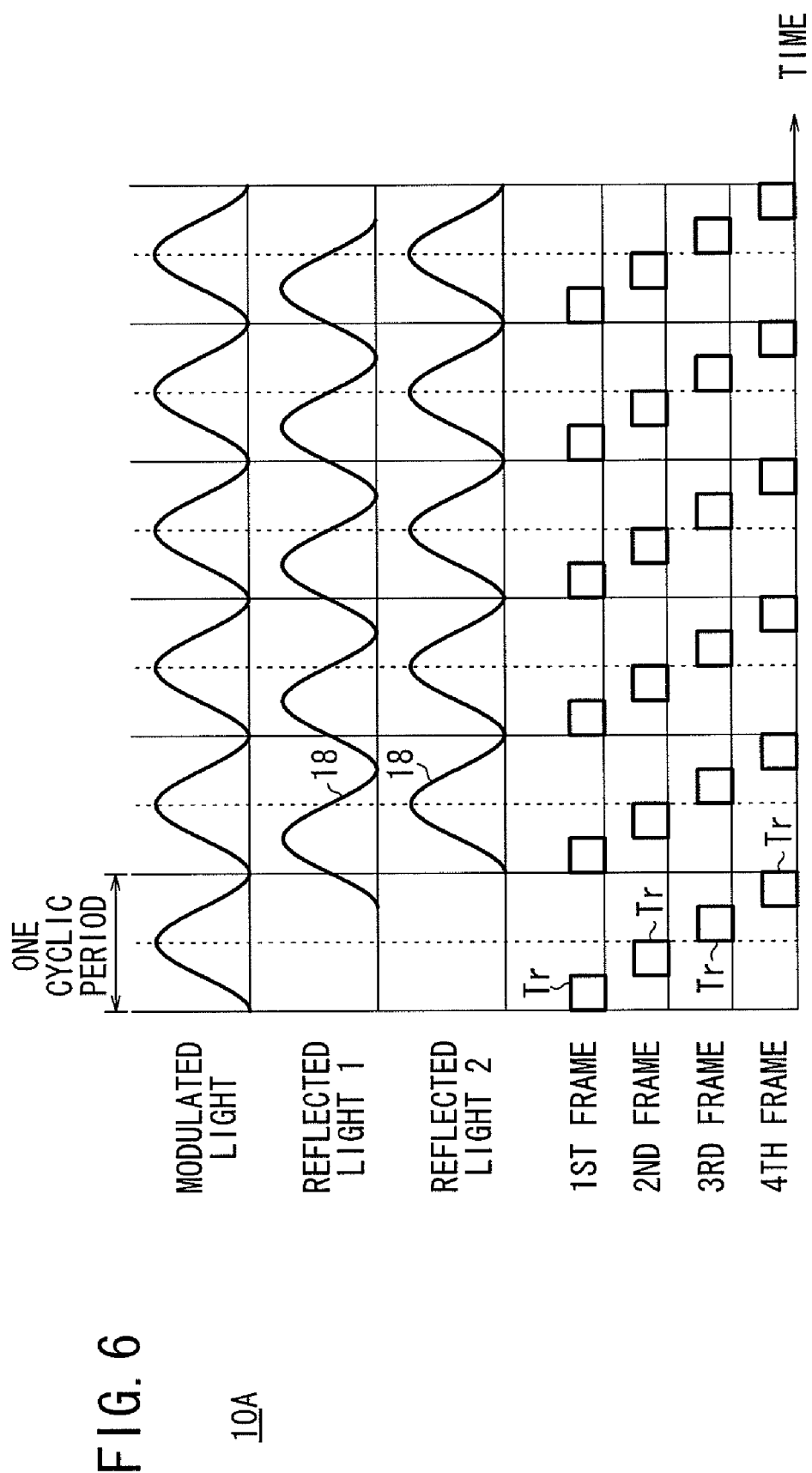
FIG. 6 is a waveform diagram showing, by way of example, a modulated light, reflected lights, and exposure periods for determining sampled values S1 through S4 which serve as a basis for calculating a distance in the first ranging apparatus.
Figure 7:
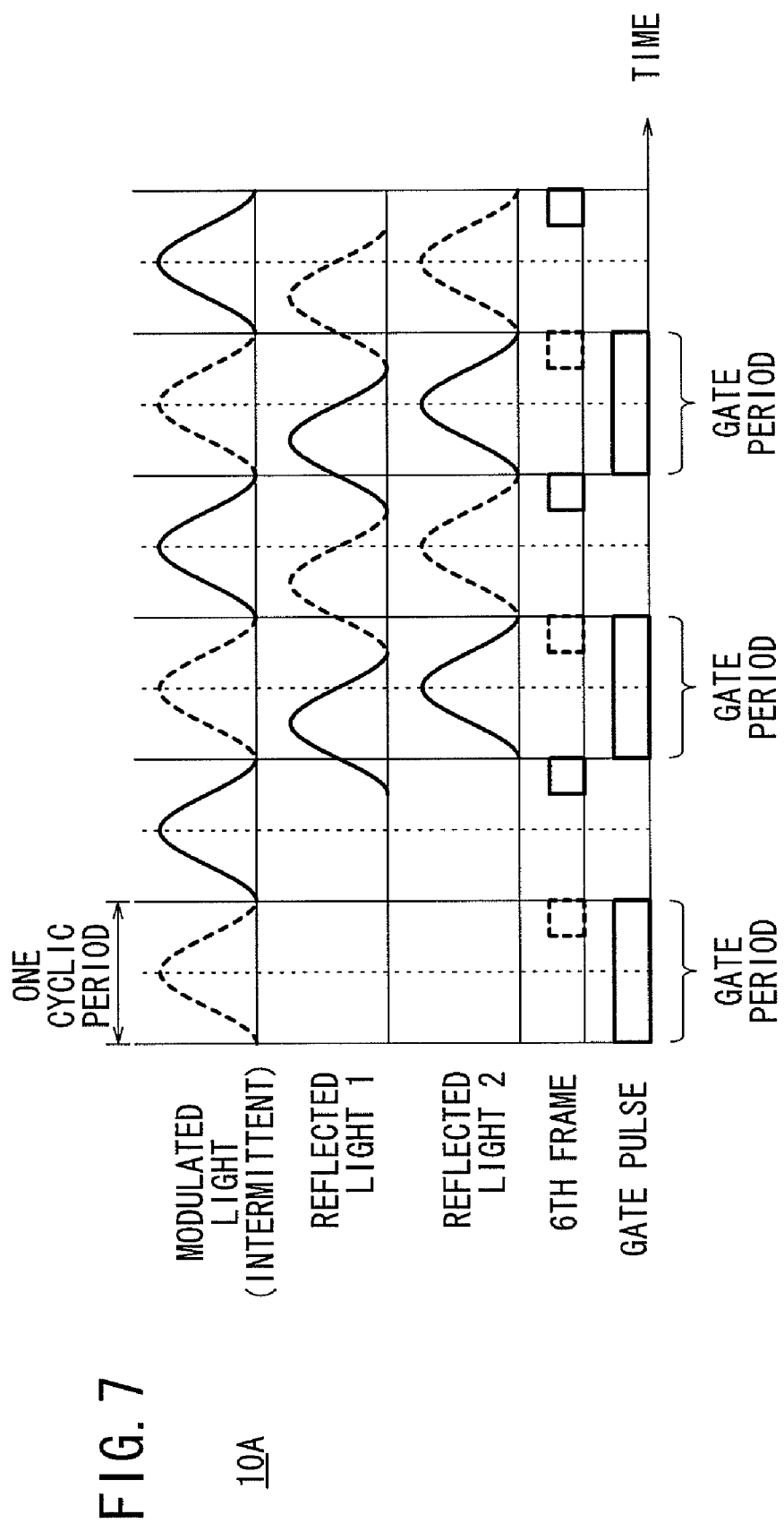
FIG. 7 is a waveform diagram showing, by way of example, a modulated light, reflected lights, exposure periods, and gate pulses in a mode of operation of the first ranging apparatus wherein the timing to apply the modulated light occurs in every other cyclic period of the modulated light and the timing to detect light with the image capturing device occurs in every other cyclic period of the modulated light.

If the ratio S of signal levels for a pixel is smaller than the reference value T in step S9, then since the pixel has detected the reflected light 2 shown in FIGS. 6 and 7, control goes to step S10 in which the corrector 68 judges that the distance up to the object 16 with respect to the pixel is equal to or greater than the distance commensurate with the ½ cyclic period of the modulated light 12, and adds the distance value commensurate with the ½ cyclic period of the modulated light 12 to the distance value calculated in step S7, i.e., corrects the distance value calculated in step S7, producing a distance value for the pixel.

Thereafter, in step S11, the corrector 68 rewrites the distance value corresponding to the pixel for which the distance values has been corrected, with the corrected (added) distance value in the distance image data.

If it is judged that the ratio S of signal levels for a pixel is equal to or greater than the reference value T in step S9, then since the pixel has detected the reflected light 1 shown in FIGS. 6 and 7, the distance value is not corrected or rewritten.

When the above processing sequence is finished on all the pixels, the operation of the distance calculator of the first ranging apparatus is put to an end.

As described above, the first ranging apparatus 10A controls the light emitter 24 to emit the modulated light 12 in every other cyclic period of the modulated light 12 and also controls the image capturing device 28 to detect the reflected light from the object 16 in every other cyclic period of the modulated light 12. Consequently, the first ranging apparatus 10A is capable of detecting a one-cyclic-period delay of the reflected light 18 and hence reducing a ranging error. As the operation of the first ranging apparatus 10A to detect a cyclic period delay of the reflected light 18 is completed in one frame, the processing time of the first ranging apparatus 10A is short.

In the above embodiment, the distance up to the object 16 is measured according to the process of detecting the reflected light 18 in the four phases, i.e., the first through fourth phases. However, the reflected light 18 may be detected in two phases or more.

Figure 9:
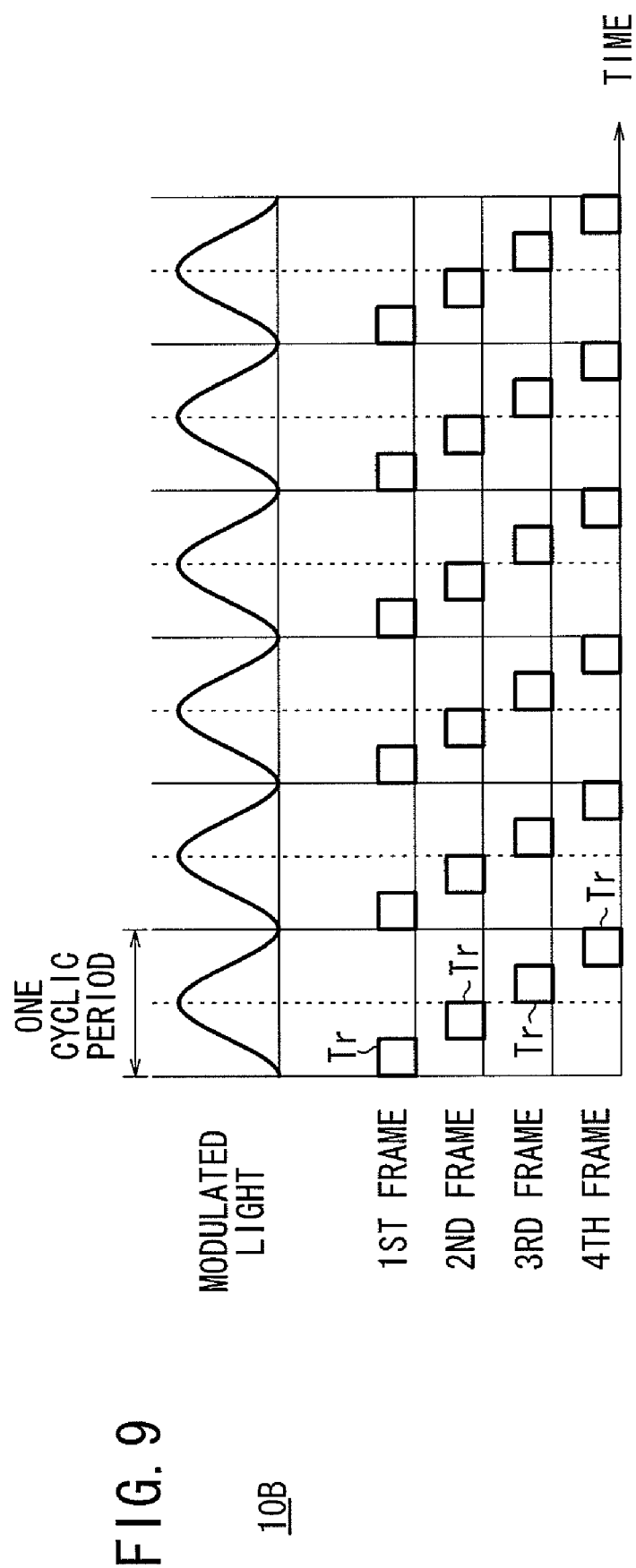
FIG. 9 is a waveform diagram showing, by way of example, a modulated light, reflected lights, and exposure periods for determining sampled values S1 through S4 which serve as a basis for calculating a distance in the second ranging apparatus.

A ranging apparatus 10B according to a second embodiment of the present invention (hereinafter referred to as "second ranging apparatus 10B") will be described below with reference to FIGS. 9 through 11.

The second ranging apparatus 10B is similar to the first ranging apparatus 10A except as follows:

The gate controller 80 controls, with the gate pulses output thereby, the light emission controller 26 to emit the modulated light 12 in every third cyclic period of the modulated light 12, and also controls, with the gate pulses output thereby, the electrooptical shutter 32 or the electronic shutter of the image capturing device 28 to detect the reflected light 18 from the object 16 which has been irradiated with the modulated light 12, in every third cyclic period of the modulated light 12.

The distance calculator 66 does not correct the distance value if the ratio S of signal levels is greater than a first reference value T1. The distance calculator 66 adds a distance corresponding to the ½ cyclic period of the modulated light 12, i.e., corrects the distance value, if the ratio S of signal levels is equal to or greater than a second reference value T2 and equal to or smaller than the first reference value Ti. The distance calculator 66 adds a distance corresponding to the one cyclic period of the modulated light 12, i.e., corrects the distance value, if the ratio S of signal levels is smaller than the second reference value T2.

A processing sequence of the second ranging apparatus 10B will be described below with reference to waveform diagrams shown in FIGS. 9 and 10 and a flowchart shown in FIG. 11.

Figure 11:
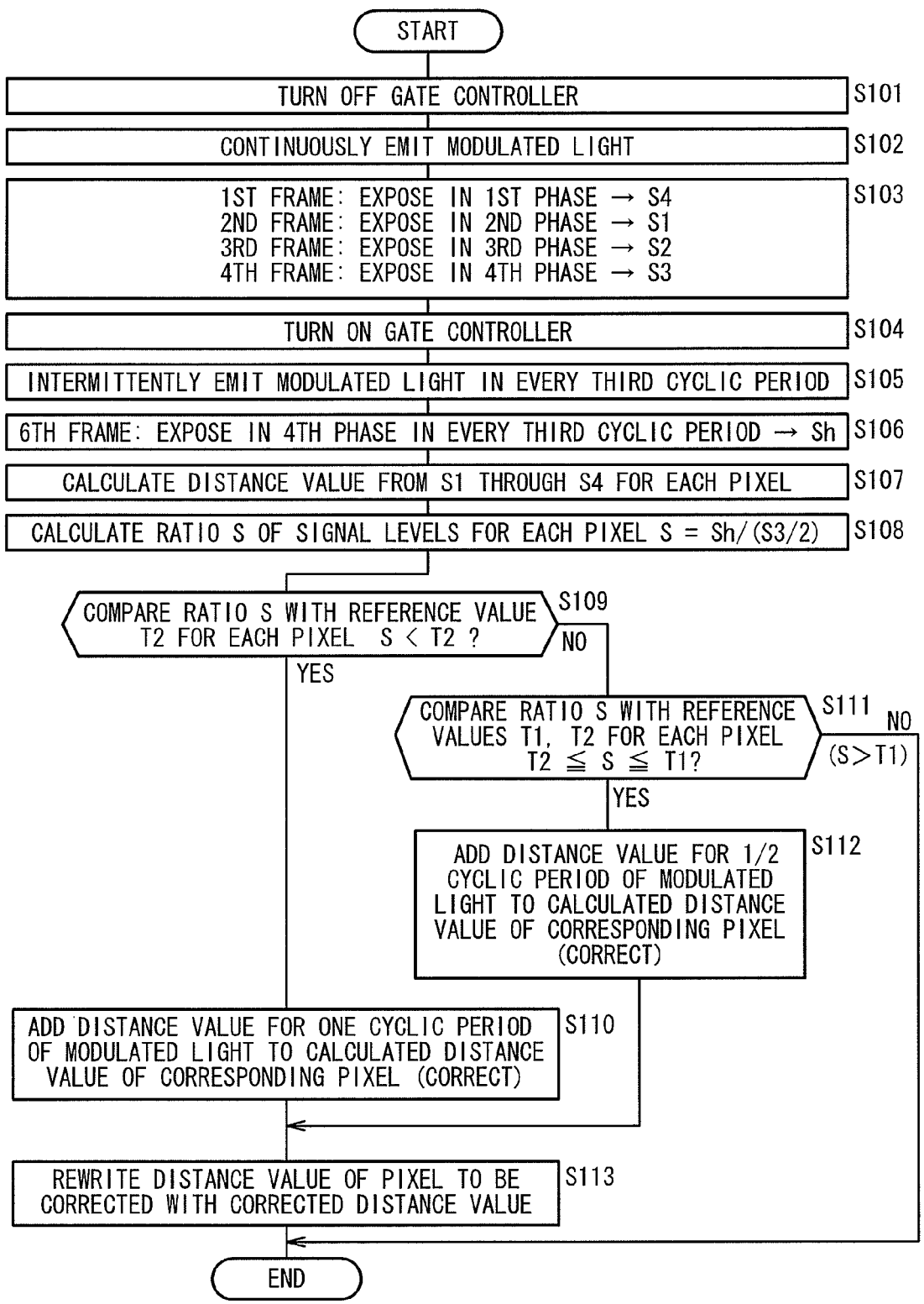
FIG. 11 is a flowchart of a processing sequence of the second ranging apparatus.

Steps S101 through S103 shown in FIG. 11 are identical to steps S1 through S3 of the processing sequence of the first ranging apparatus 10A (see FIG. 9), and will not be described in detail below.

In step S104, the gate controller 80 is turned on. In step S105, the light emission controller 26 is controlled by the gate controller 80 to emit the modulated light 12 in every third cyclic period of the modulated light 12. The modulated light 12 is intermittently emitted from the light emitter 24 in response to a negative-going edge of a synchronizing signal representing a sixth frame, for example.

In step S106, the gate controller 80 controls the electrooptical shutter or the electronic shutter of the image capturing device 28 for the image capturing device 28 to detect the reflected light 18 intermittently. Specifically, the gate controller 80 controls the image capturing device 28 to perform an excuse process when the modulated light 12 reaches the fourth phase of 180°, for example. The light emitter 24 emits the modulated light 12 intermittently and the image capturing device 28 detects the reflected light 18 intermittently in synchronism with each other under the control of the gate controller 80. For example, as shown FIG. 10, the light emitter 24 does not emit the modulated light 12 and the image capturing device 28 does not detect the reflected light 18 in periods corresponding to the first and second cyclic periods, the fifth and sixth cyclic periods, the ninth and tenth cyclic periods, . . . of the modulated light 12 in the sixth frame, and the light emitter 24 emits the modulated light 12 and the image capturing device 28 detects the reflected light 18 in periods corresponding to the third and fourth cyclic periods, the seventh and eighth cyclic periods, the eleventh and twelfth cyclic periods, . . . of the modulated light 12 in the sixth frame. In the sixth frame, the amount of the reflected light 18 at the time when the phase of the modulated light 12 that is emitted in every third cyclic period thereof is 180° is photoelectrically converted into an electric charge and the electric charge is stored in the image capturing device 28. Since the image capturing device 28 detects the reflected light 18 in every third cyclic period, the total exposure time of the image capturing device 28 in the sixth frame is ½ of the total exposure time in each of the first through fourth frames.

In a seventh frame, the electric charge stored in the sixth frame is transferred as an analog signal (image signal), and converted into digital data which are stored in the buffer memory 64 as corrective image data representing a pixel-dependent array of sampled corrective amplitudes Sh.

In step S107, the distance calculator 66 calculates distance values up to the object 16 which correspond to the respective pixels 46 based on the sampled amplitudes S1 through S4 of the first through fourth image data. Distance image data are thus generated which have a data structure comprising an array of distance values corresponding to the respective pixels 46.

Thereafter, in step S108, the corrector 68 determines a ratio S of signal levels for each pixel from each of the sampled amplitudes S3 of the third image data and each of the sampled amplitudes Sh of the corrective image data according to the following equation (shown for one pixel):

$$S=Sh/(S3/2)$$

The total exposure time for obtaining the corrective image data is ½ of the total exposure time for obtaining the fourth image data. Therefore, the sampled amplitudes S3 are reduced to ½.

In step S109, the corrector 68 compares the ratio S of signal levels for each pixel with the first reference value T1 and the second reference value T2, respectively. The first reference value T1 corresponds to a distance commensurate with the ½ cyclic period of the modulated light 12. The second reference value T2 corresponds to a distance commensurate with the one cyclic period of the modulated light 12.

The first and second reference values T1, T2 are determined as follows: If the distance up to the object 16 is commensurate with the one cyclic period of the modulated light 12, then since no reflected light comes within the emission period of the modulated light 12, an electric charge is seldom stored in the image capturing device 28. Therefore, the ratio S of signal levels is essentially nil. Though the second reference value T2 should ideally be nil, it is actually set to 0.05 or the like in view of residual smearing, ambient light, etc. If the distance up to the object 16 is commensurate with the ½ cyclic period of the modulated light 12, then the reflected light 18 comes at a time when half of the emission period has elapsed after the emission of the modulated light 12. The reference value T1 is produced by adding an error of 5%, for example, in view of residual smearing, ambient light, etc., to a value which is a one-fourth of a sampled amplitude S3 obtained by detecting the reflected light 18 that is delayed a one cyclic period from the emission time at which the modulated light 12 starts being continuously applied, when the modulated light 12 has reached the fourth phase of 180°, for example, throughout one frame.

Figure 10:
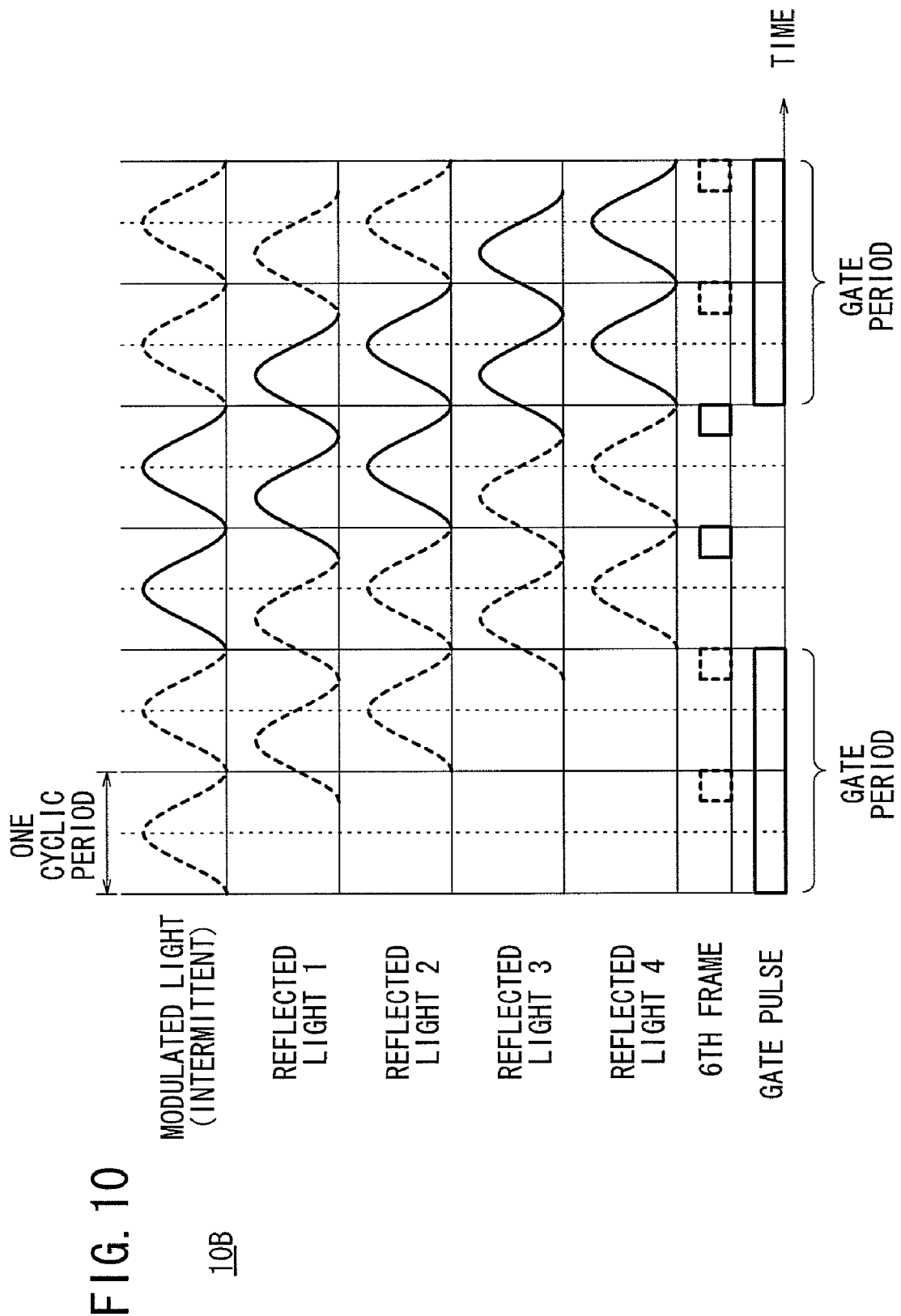
FIG. 10 is a waveform diagram showing, by way of example, a modulated light, reflected lights, exposure periods, and gate pulses in a mode of operation of the second ranging apparatus wherein the timing to apply the modulated light occurs in every third cyclic period of the modulated light and the timing to detect light with the image capturing device occurs in every third cyclic period of the modulated light.

If the ratio S of signal levels for a pixel is smaller than the second reference value T2 in step S109, i.e., in the case of the reflected light 4 shown in FIG. 10, for example, then control goes to step S110 in which the corrector 68 judges that the distance up to the object 16 with respect to the pixel is equal to or greater than the distance commensurate with the one cyclic period of the modulated light 12, and adds the distance value commensurate with the one cyclic period of the modulated light 12 to the distance value calculated in step S107, i.e., corrects the distance value calculated in step S107, thereby producing a distance value for the pixel.

If the ratio S of signal levels for a pixel is equal to or greater than the second reference value T2 and equal to or smaller than the first reference value T1 in step S111, i.e., in the case of the reflected light 2 or 3 shown in FIG. 10, for example, then control goes to step S112 in which the corrector 68 judges that the distance up to the object 16 with respect to the pixel is equal to or greater than the distance commensurate with the ½ cyclic period of the modulated light 12, and adds the distance value commensurate with the ½ cyclic period of the modulated light 12 to the distance value calculated in step S107, i.e., corrects the distance value calculated in step S107, thereby producing a distance value for the pixel.

After step S110 or S112, the corrector 68 rewrites the distance value corresponding to the pixel for which the distance values has been corrected, with the corrected (added) distance value in the distance image data, in step S113.

If the ratio S of signal levels for a pixel is greater than the first reference value T1, i.e., in the case of the reflected light 1 shown in FIG. 10, for example, then the distance value is not corrected or rewritten.

When the above processing sequence is finished on all the pixels, the operation of the distance calculator 66 and the corrector 68 of the second ranging apparatus 10B is put to an end.

As described above, the second ranging apparatus 10B controls the light emitter 24 to emit the modulated light 12 in every third cyclic period of the modulated light 12 and also controls the image capturing device 28 to detect the reflected light from the object 16 in every third cyclic period of the modulated light 12. Consequently, the second ranging apparatus 10B is capable of detecting a one-cyclic-period delay and a two-cyclic-period delay of the reflected light 18 and hence reducing a ranging error.

The total exposure time for performing the correction controlled by the gate controller 80 can be maintained at ½ of the normal total exposure time. As the total exposure time remains unchanged even if the cyclic periods for intermittently emitting the modulated light or intermittently detecting the reflected light are changed by the gate controller 80, the reflected light can be detected stably.

In the above embodiment, the gate controller 80 controls the light emission controller 26 to emit the modulated light 12 in every third cyclic period of the modulated light 12, and also controls the electrooptical shutter 32 or the electronic shutter of the image capturing device 28 to detect the reflected light 18 from the object 16 in every third cyclic period of the modulated light 12. However, the gate controller 80 may control the light emission controller 26 to emit the modulated light 12 in every nth (n=1, 2, ... ) cyclic period of the modulated light 12, and also may control the electrooptical shutter 32 or the electronic shutter of the image capturing device 28 to detect the reflected light 18 from the object 16 in every nth cyclic period of the modulated light 12.

In this case, the corrector 68 compares the ratio S of signal levels at the end of each cyclic period (at the time when the modulated light 12 reaches the fourth phase of 180°, for example) with the first reference value T1 corresponding to the distance commensurate with the ½ cyclic period of the modulated light 12, the second reference value T2 corresponding to the distance commensurate with the one cyclic period of the modulated light 12, a third reference value T3 corresponding to a distance commensurate with a 3/2 cyclic period of the modulated light 12, ... , an (n−1)th reference value Tn−1 corresponding to a distance commensurate with an (n−1)/2 cyclic period of the modulated light 12, and an nth reference value Tn corresponding to a distance commensurate with an n/2 cyclic period of the modulated light 12. If the ratio S of signal levels is greater than the first reference value T1, then the corrector 68 does not correct the distance value. If the ratio S of signal levels is equal to or greater than the nth reference value and equal to or smaller than the (n−1)th reference value Tn−1, then the corrector 68 adds the distance commensurate with the (n−1)/2 cyclic period of the modulated light 12 to the distance value. If the ratio S of signal levels is smaller than the nth reference value Tn, then the corrector 68 adds the distance commensurate with the n/2 cyclic period of the modulated light 12 to the distance value.

Since the second ranging apparatus 10B is capable of detecting one-cyclic-period delay through n-cyclic-period delay of the reflected light 18, the second ranging apparatus 10B is capable of reducing a ranging error.

In addition, the total exposure time for performing the correction controlled by the gate controller 80 can also be maintained at ½ of the normal total exposure time. As the total exposure time remains unchanged even if the cyclic periods for intermittently emitting the modulated light or intermittently detecting the reflected light are changed by the gate controller 80, the reflected light can be detected stably.

A ranging apparatus 10C according to a third embodiment of the present invention (hereinafter referred to as "third ranging apparatus 10C") will be described below with reference to a flowchart shown in FIG. 12 and a waveform diagram shown in FIG. 13.

The third ranging apparatus 10C is similar to the second ranging apparatus 10B except as follows:

The corrector 68 corrects the distance values with respect to those pixels of all the pixels wherein the phase difference φ between the modulated light 12 and the reflected light 18 falls in a predetermined range.

Specifically, a processing sequence of the third ranging apparatus 10C will be described below with reference to the waveform diagrams shown in FIGS. 6 and 13 and the flowchart shown in FIG. 12.

Figure 12:
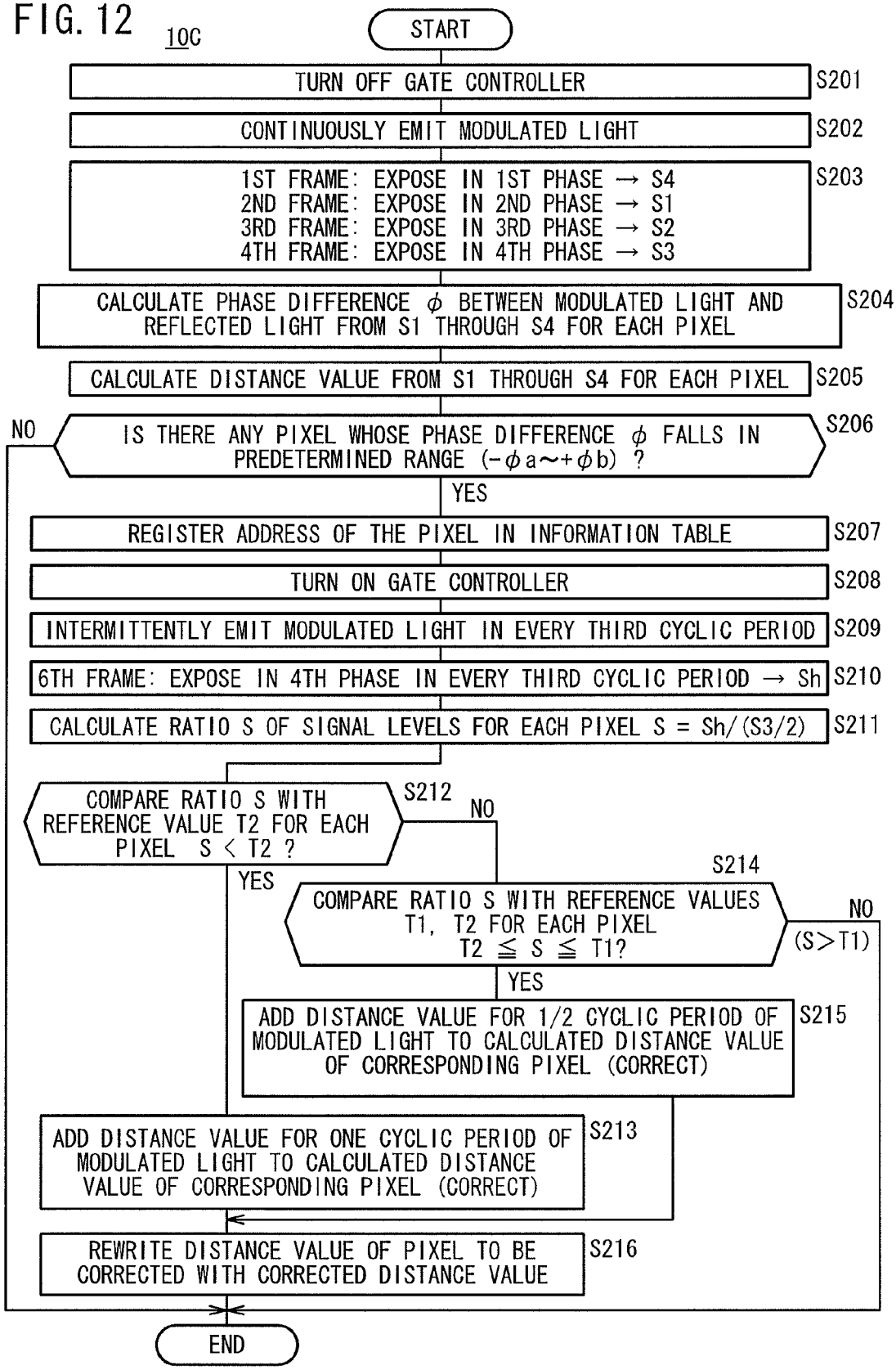
FIG. 12 is a flowchart of a processing sequence of the third ranging apparatus.
Figure 13:
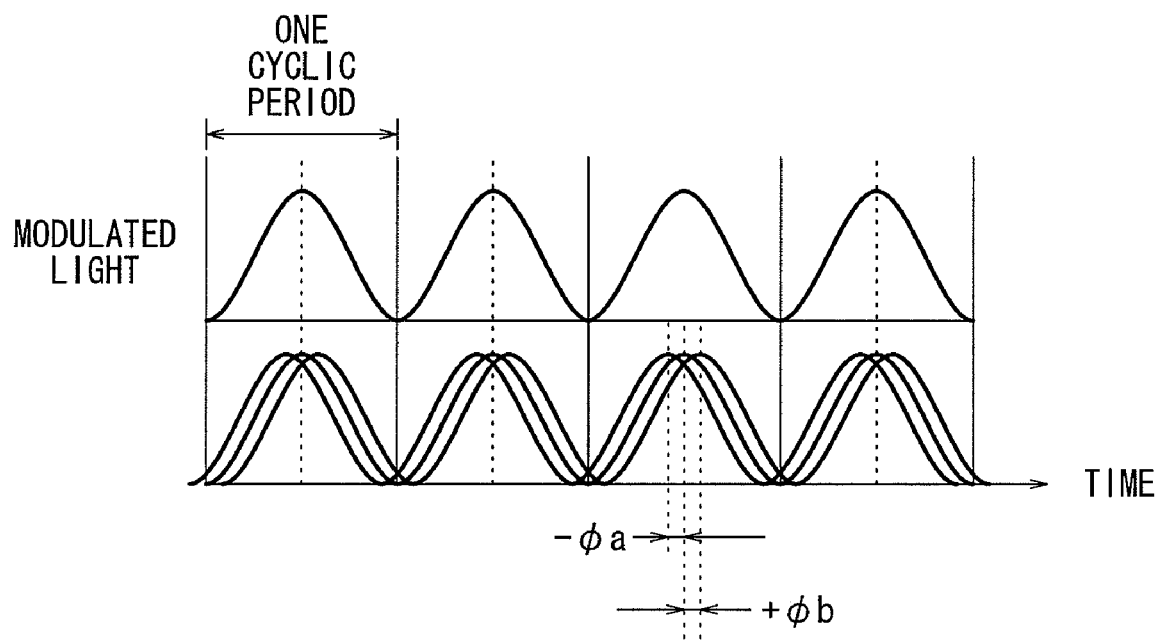
FIG. 13 is a waveform diagram illustrative of a criterion for determining periodic delays of reflected lights based on phase differences between a modulated light and reflected lights.

Steps S201 through S203 shown in FIG. 12 are identical to steps S101 through S103 of the processing sequence of the second ranging apparatus 10B, and will not be described in detail below.

In step S204, the distance calculator calculates the phase difference φ between the modulated light 12 and the reflected light 18 for each pixel based on the sampled values S1 through S4 of the first through fourth image data. Phase difference image data are thus generated which have a data structure comprising an array of phase differences φ corresponding to the respective pixels 46.

In step S205, the distance calculator 66 calculates the distance values up to the object 16 which correspond to the respective pixels 46 based on the phase differences φ corresponding to the respective pixels 46. Distance image data are thus generated which have a data structure comprising an array of distance values corresponding to the respective pixels 46.

In step S206, the corrector 68 compares each of the phase differences φ of the phase difference image data with a predetermined range. The predetermined range is defined as follows: If the phase difference φ is nil though the object 16 is in a distant position, then it indicates that the distance up to the object 16 is nil, which is contradictory to the actually measured distance value. As shown in FIG. 13, a phase difference range covering φa (e.g., 1° through 3°) in the negative direction and φb (e.g., 1° through 5°) in the positive direction on both sides of the nil point is defined as the predetermined range ($-\phi a \leq \phi \leq +\phi b$). If the phase difference φ falls in the predetermined range thus defined, the corrector 68 judges that the distance up to the object 16 is equal to or greater than a distance commensurate with the ½ cyclic period of the modulated light 12.

If the corrector 68 judges in step S206 that the phase differences φ with respect to all the pixels do not fall in the predetermined range, then the processing sequence of the corrector 68 is put to an end.

If the corrector 68 judges that the phase difference φ with respect to at least one pixel falls in the predetermined range, then control goes to next step S207. In step S207, the address of the pixel with respect to which the phase difference φ falls in the predetermined range is registered in an information table, for example.

In step S208 and subsequent steps, the same process as the processing sequence of the second ranging apparatus 10B, particularly from step S104 shown in FIG. 11, will be carried out. The process from step S208 will therefore not be described in detail below.

When the above processing sequence is finished on all the pixels, the operation of the distance calculator 66 and the corrector 68 of the third ranging apparatus 10C is put to an end.

As described above, the corrector 68 performs its processing operation when the phase difference φ between the modulated light 12 and the reflected light 18 falls in the predetermined range, and thus, the gate controller 80 does not need to control the light emission controller 26 to emit the modulated light 12 intermittently and also to control the image capturing device 28 to detect the reflected light 18 intermittently in each cycle. As pixels to be corrected (registered pixels) can be specified, the calculating process can be reduced accordingly for reducing the processing time, thereby providing a faster process. Furthermore, since the predetermined range that is established to detect pixels to be corrected is set to a range wherein the reflected light 18 is highly likely to be delayed by a one cyclic period, the predetermined range is effective to reduce a ranging error.

Figure 14:
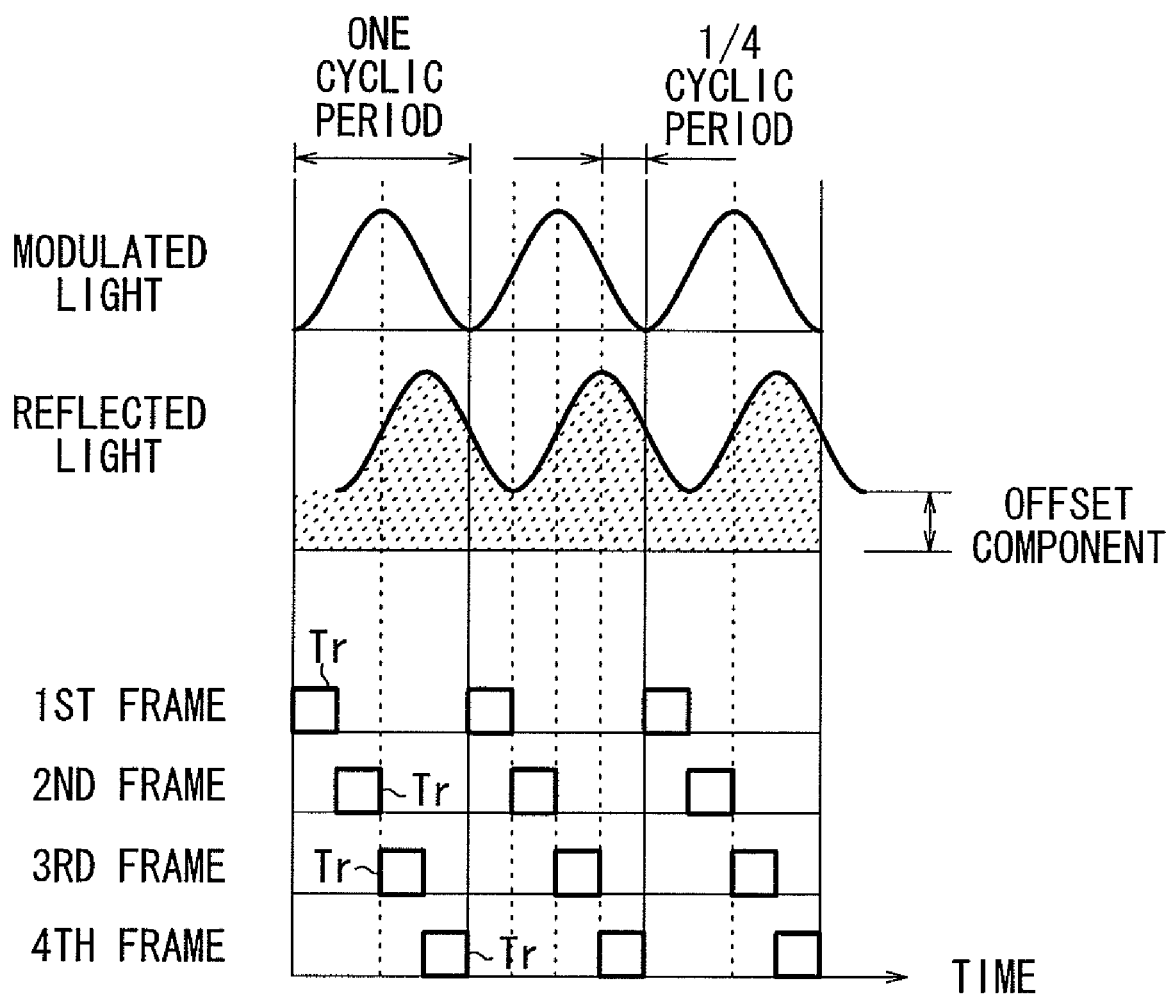
FIG. 14 is a waveform diagram showing, by way of example, a modulated light, a reflected light, and exposure periods in a case wherein an offset component is added to the reflected light.

As shown in FIG. 14, if light (ambient light or the like) other than the modulated light 12 is added to the reflected light 18 or a DC component is added to the modulated light 12, then the ratio S of signal levels may possibly be varied and not detected accurately. To eliminate such a difficulty, the ambient light or the DC component (hereinafter referred to as "offset component d") is determined by calculations, and the ratio S of signal levels is calculated taking the offset component d into account.

Figure 15:
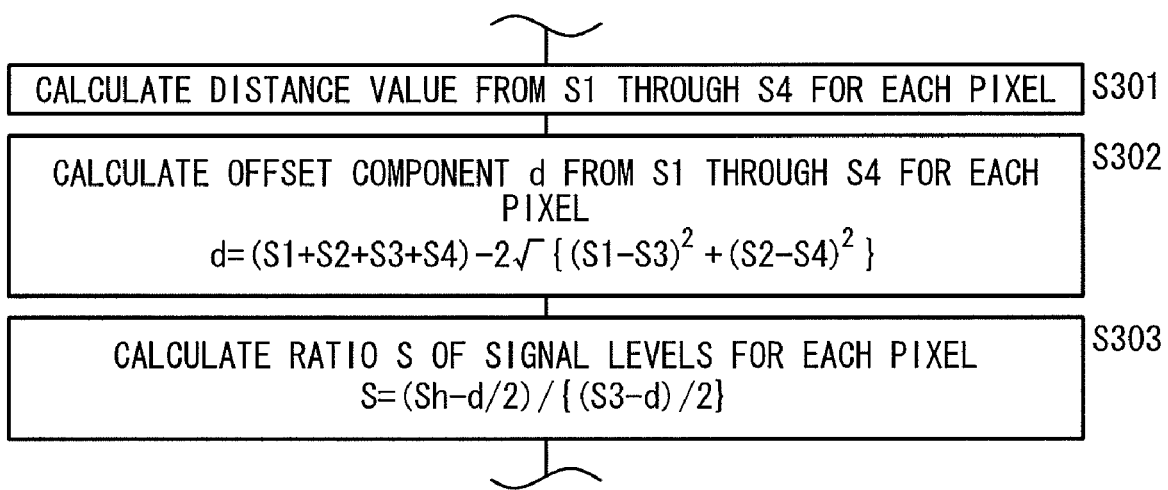
FIG. 15 is a flowchart of a processing sequence for calculating a ratio of signal levels taking an offset component into account.

Specifically, in step S301 shown in FIG. 15, the distance calculator 66 calculates distance values up to the object 16 which correspond to the respective pixels 46 based on the sampled amplitudes S1 through S4 of the first through fourth image data. Distance image data are thus generated which have a data structure comprising an array of distance values corresponding to the respective pixels 46.

Thereafter, in step S302, the corrector 68 determines offset components d for the respective pixels 46 from the sampled amplitudes S1 through S4 of the first through fourth image data according to the following equation (shown for one pixel):

$$d=(S1+S2+S3+S4)-2\sqrt{\{(S1-S3)^2+(S2-S4)^2\}}$$

Offset component image data are thus generated which have a data structure comprising an array of offset components d corresponding to the respective pixels 46.

Thereafter, in step S303, the corrector 68 determines a ratio S of signal levels for each pixel from each of the sampled amplitudes S3 of the third image data and each of the sampled amplitudes Sh of the corrective image data according to the following equation (shown for one pixel):

$$S=(Sh-d/2)/\{((S3-d)/2\}$$

Ratio image data are thus generated which have a data structure comprising an array of ratios S of signal levels corresponding to the respective pixels 46.

The corrector 68 of each of the first through third ranging apparatus 10A, 10B, 10C may perform the above process to determine offset components d easily from the sampled amplitudes S1 through S4 without the need for adding a dedicated exposure control process for detecting offset components d to the first through third ranging apparatus 10A, 10B, 10C. Consequently, even if an offset component d is added to the reflected light 18, the ranging apparatus can accurately detect cyclic period delays of the reflected light for the accurate measurement of the distance up to the object 16.

Figure 16:
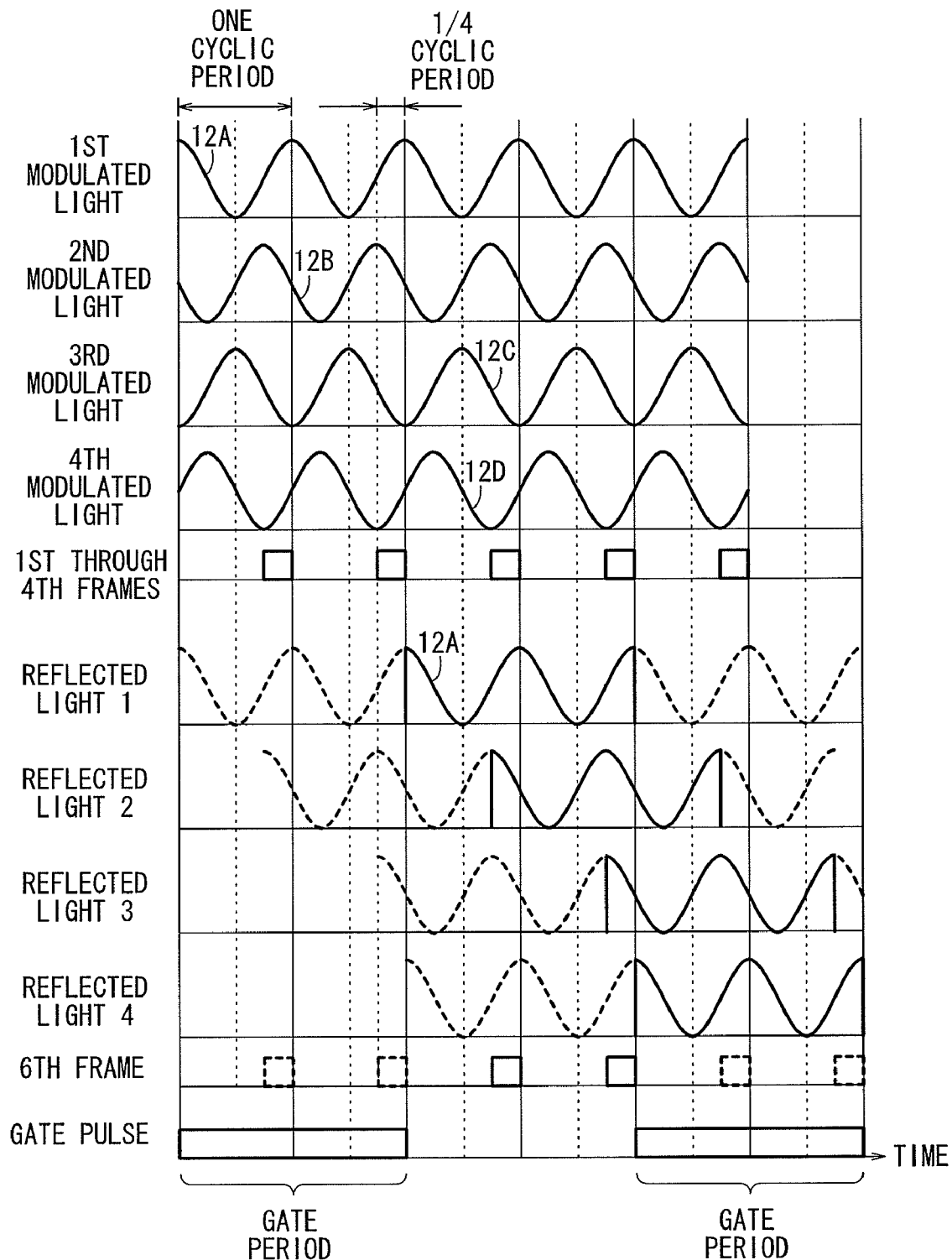
FIG. 16 is a waveform diagram showing, by way of example, first through fourth modulated lights and exposure periods for determining sampled values S1 through S4 which serve as a basis for calculating a distance, and the first modulated light, reflected lights, exposure periods, and gate pulses in a mode of operation of the fourth ranging apparatus wherein the timing to apply the first modulated light occurs in every third cyclic period of the modulated light and the timing to detect light with the image capturing device occurs in every third cyclic period of the modulated light.

A ranging apparatus 10D according to a fourth embodiment of the present invention (hereinafter referred to as "fourth ranging apparatus 10D") will be described below with reference to a waveform diagram shown in FIG. 16 and a flowchart shown in FIG. 17.

The fourth ranging apparatus 10D is similar to the second ranging apparatus 10B except as follows:

The light emission controller 26 controls the phase of the modulated light 12 at the time when it starts being emitted (start phase). As shown in FIG. 16, the light emitter 24 emits, in series, a first modulated light 12A which starts being emitted in a phase 1, a second modulated light 12B which starts being emitted in a phase 2, a third modulated light 12C which starts being emitted in a phase 3, and a fourth modulated light 12D which starts being emitted in a phase 4.

The image capturing device controller of the first signal processing system 36 controls the image capturing device 28 to perform an exposure process in final one-quarter cyclic periods of the cyclic periods of the first through fourth modulated lights 12A, 12B, 12C, 12D.

The first modulated light 12A has a waveform such that its phase at the time of starting to be emitted is the phase 1 (e.g., 90°), and its phase at the time when a three-quarter cyclic period of each cyclic period has elapsed is a second phase (e.g., 0°). The second modulated light 12B has a waveform such that its phase at the time of starting to be emitted is the phase 2 (e.g., 180°), and its phase at the time when a three-quarter cyclic period of each cyclic period has elapsed is a third phase (e.g., 90°).

Similarly, the third modulated light 12C has a waveform such that its phase at the time of starting to be emitted is the phase 3 (e.g., 270°), and its phase at the time when a three-quarter cyclic period of each cyclic period has elapsed is a fourth phase (e.g., 180°). The fourth modulated light 12D has a waveform such that its phase at the time of starting to be emitted is the phase 4 (e.g., 0°), and its phase at the time when a three-quarter cyclic period of each cyclic period has elapsed is a first phase (e.g., 270°).

When the first modulated light 12A is emitted and its reflected light 18 is detected, the image capturing device 28 is exposed for a given period of time at the time when the phase of the first modulated light 12A becomes the second phase (e.g., 0°). When the second modulated light 12B is emitted and its reflected light 18 is detected, the image capturing device 28 is exposed for a given period of time at the time when the phase of the second modulated light 12B becomes the third phase (e.g., 90°). Similarly, when the third modulated light 12C is emitted and its reflected light 18 is detected, the image capturing device 28 is exposed for a given period of time at the time when the phase of the third modulated light 12C becomes the fourth phase (e.g., 180°). When the fourth modulated light 12D is emitted and its reflected light 18 is detected, the image capturing device 28 is exposed for a given period of time at the time when the phase of the fourth modulated light 12D becomes the first phase (e.g., 270°).

When the gate controller 80 is turned on, the light emission controller 26 controls the light emitter 24 to emit the first modulated light 12A in every third cyclic period of the first modulated light 12A, and controls the image capturing device 28 to detect the reflected light 18 from the object 16 which has been irradiated with the first modulated light 12A, in every third cyclic period of the first modulated light 12A. At this time, since the image capturing device controller of the first signal processing system 36 controls the image capturing device 28 to be exposed for final one-quarter cyclic periods of the cyclic periods of the first modulated light 12A, the image capturing device 28 is exposed for a given period of time at the time when the phase of the first modulated light 12A becomes the second phase (e.g., 0°).

A processing sequence of the fourth ranging apparatus 10D will be described below with reference to the waveform diagrams shown in FIGS. 6 and 16 and the flowchart shown in FIG. 17.

Figure 17:
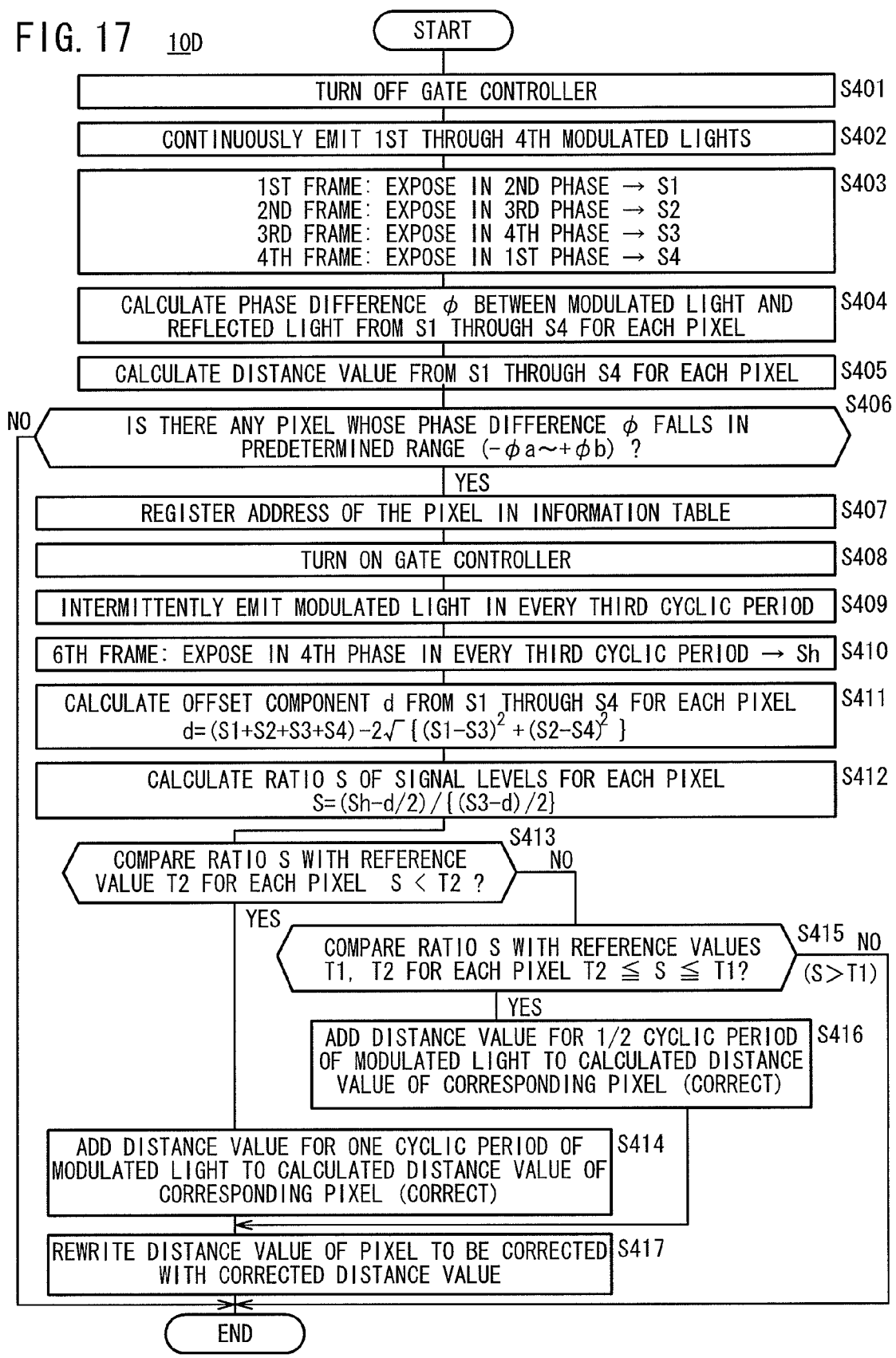
FIG. 17 is a flowchart of a processing sequence of the fourth ranging apparatus.
Figure 18:
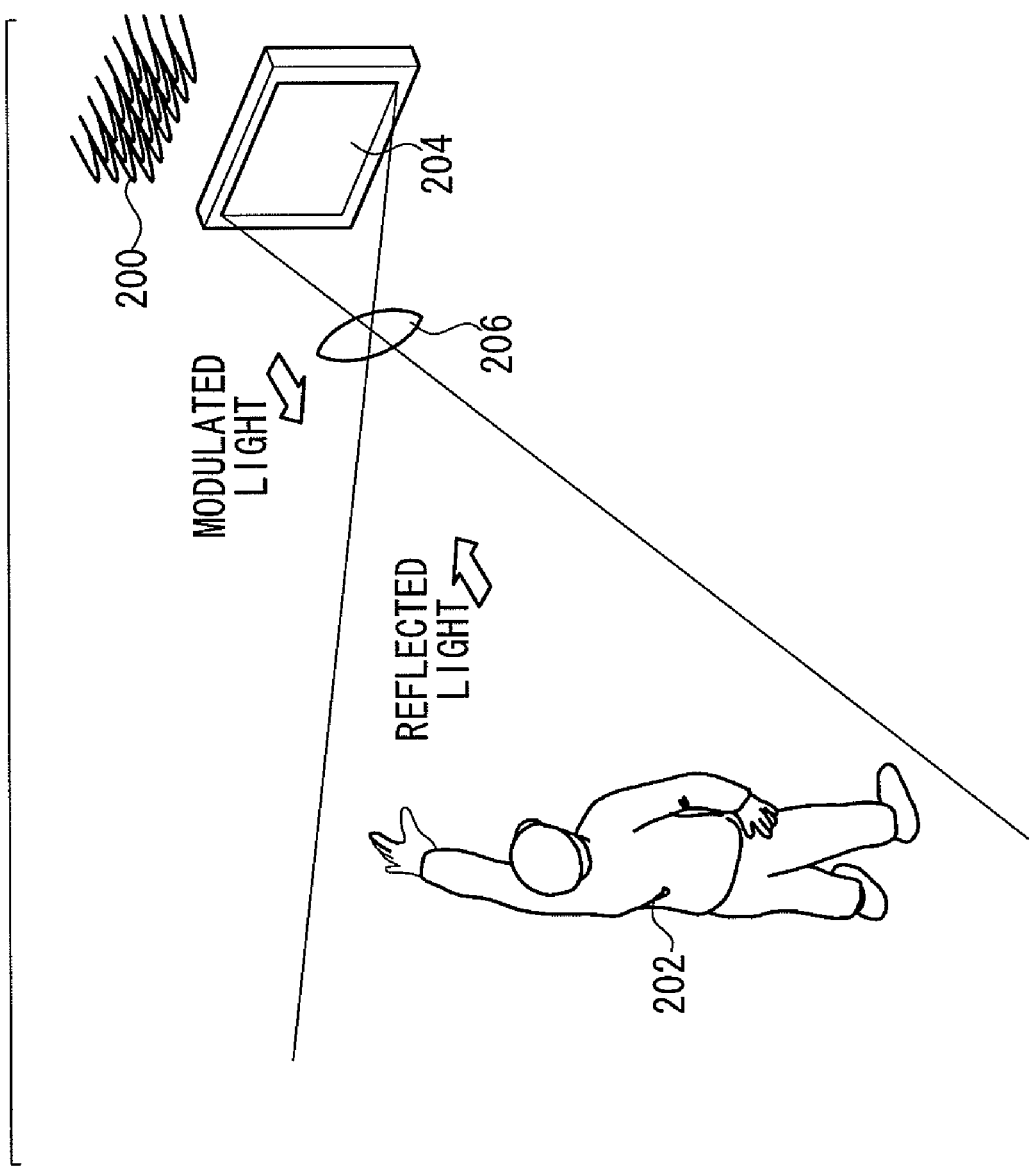
FIG. 18 is a view illustrative of an optical TOF ranging process.
Figure 19:
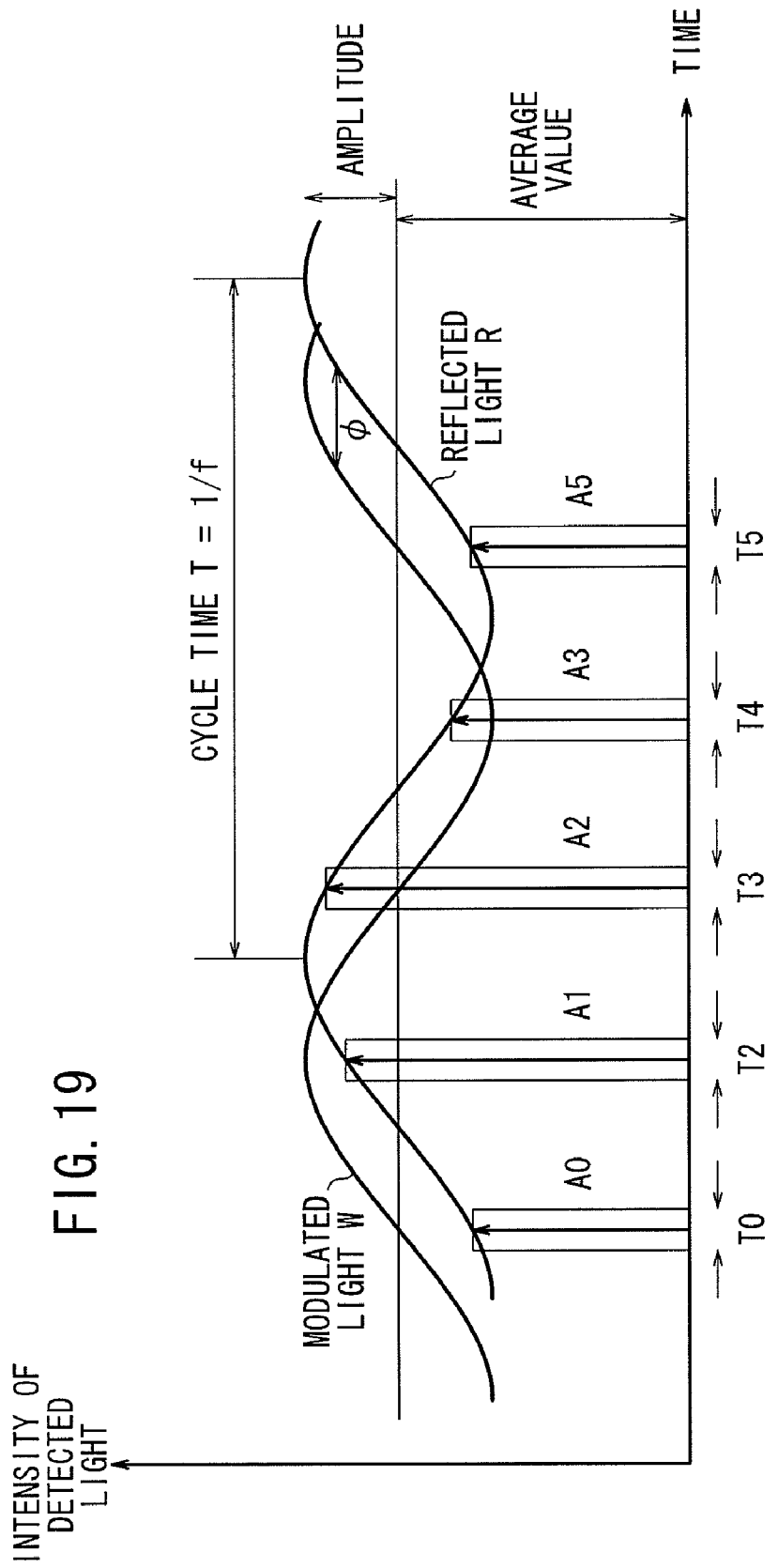
FIG. 19 is a waveform diagram showing a phase delay that a reflected light undergoes with respect to a modulated light.

In step S401 shown in FIG. 17, the gate controller 80 is turned off to disable its intermittent control operation.

In step S402, the light emitter 24 emits the first through fourth modulated lights 12A, 12B, 12C, 12D in respective given cyclic periods (e.g., frames). The light-detecting unit 20 detects the reflected light 18 at preset timings as described above.

The first through fourth image data are stored in the buffer memory 64 in step S403 as described below.

In the first frame, the amount of the reflected light 18 at the time when the phase of the first modulated light 12A is 0° (the second phase), is converted into an electric charge, which is stored in the image capturing device 28.

In the second frame, the amount of the reflected light 18 at the time when the phase of the second modulated light 12B is 90° (the third phase), is converted into an electric charge, which is stored in the image capturing device 28. Also, in the second frame, the electric charge stored in the image capturing device 28 in the first frame is transferred as an analog signal (image signal), and the analog signal is converted into a digital signal. The digital signal is saved in the buffer memory 64 as first image data representing a pixel-dependent array of sampled amplitudes S1 of the reflected light 18 at the time when the phase of the first modulated light 12A is 0°.

In the third frame, the amount of the reflected light 18 at the time when the phase of the third modulated light 12C is 180° (the fourth phase), is converted into an electric charge, which is stored in the image capturing device 28. Also, in the third frame, the electric charge stored in the image capturing device 28 in the second frame is transferred as an analog signal (image signal), and the analog signal is converted into a digital signal. The digital signal is saved in the buffer memory 64 as second image data representing a pixel-dependent array of sampled amplitudes S2 of the reflected light 18 at the time when the phase of the second modulated light 12B is 90°.

In the fourth frame, the amount of the reflected light 18 at the time when the phase of the fourth modulated light 12D is 270° (the first phase) is converted into an electric charge, which is stored in the image capturing device 28. Also, in the fourth frame, the electric charge stored in the image capturing device 28 in the third frame is transferred as an analog signal (image signal), and the analog signal is converted into a digital signal. The digital signal is saved in the buffer memory 64 as third image data representing a pixel-dependent array of sampled amplitudes S3 of the reflected light 18 at the time when the phase of the third modulated light 12C is 180°.

In a subsequent fifth frame, the electric charge stored in the image capturing device 28 in the fourth frame is transferred as an analog signal (image signal), and the analog signal is converted into a digital signal. The digital signal is saved in the buffer memory 64 as fourth image data representing a pixel-dependent array of sampled amplitudes S4 of the reflected light 18 at the time when the phase of the fourth modulated light 12D is 270°.

In this stage, the buffer memory 64 has stored the first through fourth image data.

Thereafter, in step S404, the distance calculator 66 calculates the phase difference $\phi$ between the modulated light 12 and the reflected light 18 for each pixel based on the sampled values S1 through S4 of the first through fourth image data. Phase difference image data are thus generated which have a data structure comprising an array of phase differences $\phi$ corresponding to the respective pixels 46.

In step S405, the distance calculator 66 calculates the distances up to the object 16 which correspond to the respective pixels 46 based on the phase differences $\phi$ corresponding to the respective pixels 46. Distance image data are thus generated which have a data structure comprising an array of distance values corresponding to the respective pixels 46.

In step S406, the corrector 68 compares each of the phase differences $\phi$ of the phase difference image data with a predetermined range. As described above, The predetermined range is defined as follows: A phase difference range covering $\phi a$ (e.g., 1° through 3°) in the negative direction and $\phi b$ (e.g., 1° through 5°) in the positive direction on both sides of the nil point is defined as the predetermined range ($-\phi a \leq \phi \leq +\phi b$). If the phase difference $\phi$ falls in the predetermined range thus defined, the corrector 68 judges that the distance up to the object 16 is equal to or greater than a distance commensurate with the ½ cyclic period of the modulated light 12.

If the corrector 68 judges in step S406 that the phase differences $\phi$ with respect to all the pixels do not fall in the predetermined range, then the processing sequence of the corrector 68 is put to an end.

If the corrector 68 judges that the phase difference 4 with respect to at least one pixel falls in the predetermined range, then control goes to next step 407. In step S407, the address of the pixel with respect to which the phase difference $\phi$ falls in the predetermined range is registered in an information table, for example.

In step S408 and subsequent steps, the same process as the processing sequence of the second ranging apparatus 10B, particularly from step S104 shown in FIG. 11, will be carried out. In addition, the processing sequence shown in FIG. 15 taking the offset component into account is carried out.

Specifically, the gate controller 80 is turned on in step S408. In step S409, the light emission controller 26 is controlled by the gate controller 80 to emit the first modulated light 12A in every third cyclic period of the first modulated light 12A. The first modulated light 12A is intermittently emitted from the light emitter 24 in response to a negative-going edge of a synchronizing signal representing a sixth frame, for example.

In step S410, the gate controller 80 controls the electrooptical shutter or the electronic shutter of the image capturing device for the image capturing device 28 to detect the reflected light 18 intermittently. Specifically, the gate controller 80 controls the image capturing device 28 to be exposed when the first modulated light 12A reaches the fourth phase of 180°, for example. As with the second ranging apparatus 10B, the light emitter 24 does not emit the modulated light 12 and the image capturing device 28 does not detect the reflected light 18 in periods corresponding to the first and second cyclic periods, the fifth and sixth cyclic periods, the ninth and tenth cyclic periods, . . . of the modulated light 12 in the sixth frame, and the light emitter 24 emits the modulated light 12 and the image capturing device 28 detects the reflected light 18 in periods corresponding to the third and fourth cyclic periods, the seventh and eighth cyclic periods, the eleventh and twelfth cyclic periods, . . . of the modulated light 12 in the sixth frame. In the sixth frame, the amount of the reflected light 18 at the time when the phase of the first modulated light 12A that is emitted in every third cyclic period thereof is 180°, is photoelectrically converted into an electric charge and the electric charge is stored in the image capturing device 28. Since the image capturing device 28 detects the reflected light 18 in every third cyclic period, the total exposure time of the image capturing device 28 in the sixth frame is half of the total exposure time in each of the first through fourth frames.

In a seventh frame, the electric charge stored in the sixth frame is transferred as an analog signal (image signal), and converted into digital data which are stored in the buffer memory 64 as corrective image data representing a pixel-dependent array of sampled corrective amplitudes Sh.

In step S411, the corrector 68 determines offset components d for the respective pixels 46 from the sampled amplitudes S1 through S4 of the first through fourth image data according to the following equation (shown for one pixel):

$$d=(S1+S2+S3+S4)-2\sqrt{\{(S1-S3)^2+(S2-S4)^2\}}$$

Offset component image data are thus generated which have a data structure comprising an array of offset components d corresponding to the respective pixels 46.

Thereafter, in step S412, the corrector 68 determines a ratio S of signal levels for each pixel from each of the sampled amplitudes S3 of the third image data and each of the sampled amplitudes Sh of the corrective image data according to the following equation (shown for one pixel):

$$S=(Sh-d/2)/\{(S3-d)/2\}$$

Ratio image data are thus generated which have a data structure comprising an array of ratios S of signal levels corresponding to the respective pixels 46.

In step S413 and subsequent steps, the same process as the processing sequence of the second ranging apparatus 10B, particularly from step S109 shown in FIG. 11, will be carried out. The process from step S413 will therefore not be described in detail below.

When the above processing sequence is finished on all the pixels, the operation of the distance calculator 66 and the corrector 68 of the fourth ranging apparatus 10D is put to an end.

As described above, as with the second ranging apparatus 10B, the fourth ranging apparatus 10D controls the light emitter 24 to emit the first modulated light 12A in every third cyclic period of the first modulated light 12A and also controls the image capturing device 28 to detect the reflected light 18 from the object 16 in every third cyclic period of the first modulated light 12A. Consequently, the fourth ranging apparatus 10D is capable of detecting a one-cyclic-period delay and a two-cyclic-period delay of the reflected light 18 and hence reducing a ranging error.

The total exposure time for performing the correction controlled by the gate controller 80 can be maintained at ½ of the normal total exposure time. As the total exposure time remains unchanged even if the cyclic periods for intermittently emitting the modulated light or intermittently detecting the reflected light are changed by the gate controller 80, the reflected light can be detected stably.

In particular, the fourth ranging apparatus 10D detects a cyclic period delay of the reflected light 18 using the first modulated light 12A, for example, whose amount is increased in the final one-quarter cyclic period of the cyclic period thereof. Therefore, the fourth ranging apparatus 10D can detect a cyclic period delay of the reflected light 18 with increased accuracy.

Furthermore, since all the timings of the exposure periods of the image capturing device 28 are identical to each other for the first through fourth modulated lights 12A, 12B, 12C, 12D, and the timings for detecting cyclic period delays of the reflected light 18 are also identical to the timings of the exposure periods for the first through fourth modulated lights 12A, 12B, 12C, 12D, the control process for the image capturing device 28 is not complex and the burden on the CPU is reduced.

As the routine for taking offset components d into account as shown in FIG. 15 is added (see steps S411, S412), the offset components d can be determined easily from the sampled amplitudes S1 through S4 without the need for adding a dedicated exposure control process for detecting offset components d. Consequently, even if offset components d are added to the reflected light 18, cyclic period delays of the reflected light 18 can be detected with high accuracy for the accurate measurement of the distance up to the object 16.

As with the third ranging apparatus 10C, the corrector 68 performs its processing operation if the phase difference 4 between the modulated light and the reflected light falls in the predetermined range. Accordingly, the gate controller 80 does not need to control the light emission controller 26 to emit the modulated light intermittently and also to control the image capturing device to detect the reflected light intermittently in each cycle. As pixels to be corrected (registered pixels) can be specified, the calculating process can be reduced accordingly for speeding up the processing sequence. Furthermore, since the predetermined range that is established to detect pixels to be corrected is set to a range wherein the reflected light 18 is highly likely to be delayed by one cyclic period, the predetermined range is effective to reduce a ranging error.

Although certain preferred embodiments of the present invention have been shown and described in detail, it should be understood that various changes and modifications may be made therein without departing from the scope of the appended claims.

What is claimed is:

1. A ranging apparatus comprising:
a light-emitting unit for emitting a modulated light which is intensity-modulated;
a light-detecting unit for detecting a reflected light from an object that is irradiated with said modulated light;
a calculating unit for calculating a distance up to said object based on a phase difference between said modulated light and said reflected light;
an intermittent emission control unit for controlling said light-emitting unit to intermittently emit said modulated light to said object; and
an intermittent detection control unit for controlling said light-detecting unit to intermittently detect said reflected light based on the intermittent emission of said modulated light under the control of said intermittent emission control unit;

wherein said calculating unit includes a corrector for correcting the distance up to said object based on information produced by intermittently detecting said reflected light.

2. A ranging apparatus according to claim 1, wherein said intermittent emission control unit controls said light-emitting unit to intermittently emit said modulated light to said object in every nth (n=1, 2, . . . ) cyclic period of said modulated light, and said intermittent detection control unit controls said light-detecting unit to intermittently detect said reflected light in every nth cyclic period of said modulated light.

3. A ranging apparatus according to claim 2, wherein said light-detecting unit comprises:
- an image capturing device for sampling an amount of the reflected light in exposure periods, said exposure periods being established on the basis of a constant cyclic period with respect to a time when said modulated light starts being emitted;
- wherein said intermittent detection control unit controls said image capturing device to sample the amount of the reflected light in a terminal portion of each cyclic period in the every nth cyclic period of said modulated light which is intermittently applied to said object.

4. A ranging apparatus according to claim 3, wherein said corrector compares a sampled value in the terminal portion of each cyclic period in the every nth cyclic period with a first reference value corresponding to a distance commensurate with a ½ cyclic period of the modulated light, an (n−1)th reference value corresponding to a distance commensurate with an (n−1)/2 cyclic period of the modulated light, and an nth reference value corresponding to a distance commensurate with an n/2 cyclic period of the modulated light;
- if said sampled value is greater than said first reference value, said corrector does not correct said calculated distance;
- if said sampled value is equal to or greater than said nth reference value and equal to or smaller than said (n−1)th reference value, said corrector adds the distance commensurate with the (n−1)/2 cyclic period of the modulated light to said calculated distance; and
- if said sampled value is smaller than said nth reference value, said corrector adds the distance commensurate with the n/2 cyclic period of the modulated light to said calculated distance.

5. A ranging apparatus according to claim 1, wherein said intermittent emission control unit controls said light-emitting unit to intermittently emit said modulated light to said object in every other cyclic period of said modulated light, and said intermittent detection control unit controls said light-detecting unit to intermittently detect said reflected light in every other cyclic period of said modulated light.

6. A ranging apparatus according to claim 5, wherein said light-detecting unit comprises:
- an image capturing device for sampling an amount of the reflected light in exposure periods, said exposure periods being established on the basis of a constant cyclic period with respect to a time when said modulated light starts being emitted;
- wherein said intermittent detection control unit controls said image capturing device to sample the amount of the reflected light in a terminal portion of each of cyclic periods of said modulated light which is intermittently applied to said object.

7. A ranging apparatus according to claim 6, wherein said corrector compares a sampled value in the terminal portion of each of the cyclic periods with a reference value corresponding to a distance commensurate with a ½ cyclic period of the modulated light;
- if said sampled value is greater than said reference value, said corrector does not correct said calculated distance; and
- if said sampled value is equal to or smaller than said reference value, said corrector adds the distance commensurate with the ½ cyclic period of the modulated light to said calculated distance.

8. A ranging apparatus according to claim 1, wherein said corrector corrects the distance up to said object if the phase difference between said modulated light and said reflected light falls in a predetermined range.

9. A ranging apparatus according to claim 8, wherein said light-detecting unit comprises a plurality of light detectors; and
- said calculating unit calculates distances up to said object which correspond respectively to said light detectors from phase differences between said modulated light and said reflected light which correspond respectively to said light detectors, and said corrector corrects the distance up to said object with respect to each of those of said light detectors, those of said light detectors having phase differences between said modulated light and said reflected light which fall in said predetermined range.

10. A ranging apparatus according to claim 1, wherein said light-detecting unit comprises:
- an image capturing device for sampling an amount of light detected in exposure periods, said exposure periods being established on the basis of a constant cyclic period with respect to a time when said modulated light starts being emitted;
- wherein said corrector calculates an offset component by subtracting the total amount of the reflected light from the total amount of light detected, in a certain period, and corrects the distance up to said object in view of said offset component.

11. A ranging method comprising the steps of:
- a) emitting a modulated light which is intensity-modulated;
- b) detecting a reflected light from an object that is irradiated with said modulated light;
- c) calculating a distance up to said object based on a phase difference between said modulated light and said reflected light;
- d) controlling the emission of said modulated light to intermittently emit said modulated light to said object; and
- e) controlling the detection of said reflected light to intermittently detect said reflected light based on the intermittent emission of said modulated light in said step d);
    - wherein said step c) comprises the step of correcting the distance up to said object based on information produced by intermittently detecting said reflected light.

12. A ranging method according to claim 11, wherein said step d) comprises the step of controlling the emission of said modulated light to intermittently emit said modulated light to said object in every nth (n=1, 2, . . . ) cyclic period of said modulated light, and said step e) comprises the step of controlling the detection of said reflected light to intermittently detect said reflected light in every nth cyclic period of said modulated light.

13. A ranging method according to claim 12, wherein said step b) comprises the step of sampling an amount of the reflected light in exposure periods, said exposure periods being established on the basis of a constant cyclic period with reference to a time when said modulated light starts being emitted;

wherein said step e) samples an amount of the reflected light in a terminal portion of each cyclic period in the every nth cyclic period of said modulated light which is intermittently applied to said object.

14. A ranging method according to claim 13, wherein, in said step of correcting the distance up to said object, a sampled value in the terminal portion of each cyclic period in the every nth cyclic period is compared with a first reference value corresponding to a distance commensurate with a ½ cyclic period of the modulated light, an (n−1)th reference value corresponding to a distance commensurate with an (n−1)/2 cyclic period of the modulated light, and an nth reference value corresponding to a distance commensurate with an n/2 cyclic period of the modulated light;

if said sampled value is greater than said first reference value, said calculated distance is not corrected;

if said sampled value is equal to or greater than said nth reference value and equal to or smaller than said (n−1)th reference value, the distance commensurate with the (n−1)/2 cyclic period of the modulated light is added to said calculated distance; and if said sampled value is smaller than said nth reference value, the distance commensurate with the n/2 cyclic period of the modulated light is added to said calculated distance.

15. A ranging method according to claim 11, wherein said step d) controls the emission of said modulated light to intermittently emit said modulated light to said object in every other cyclic period of said modulated light, and said step e) controls the detection of said reflected light to intermittently detect said reflected light in every other cyclic period of said modulated light.

16. A ranging method according to claim 15, wherein said step b) comprises the step of sampling an amount of the reflected light in exposure periods, said exposure periods being established on the basis of a constant cyclic period with respect to a time when said modulated light starts being emitted;

wherein said step e) samples an amount of the reflected light in a terminal portion of each of cyclic periods of said modulated light which is intermittently applied to said object.

17. A ranging method according to claim 16, wherein, in said step of correcting the distance up to said object, a sampled value in the terminal portion of each of the cyclic periods is compared with a reference value corresponding to a distance commensurate with a ½ cyclic period of the modulated light;

if said sampled value is greater than said reference value, said calculated distance is not corrected; and if said sampled value is equal to or smaller than said reference value, the distance commensurate with the ½ cyclic period of the modulated light is added to said calculated distance.

18. A ranging method according to claim 11, wherein said step of correcting the distance up to said object corrects the distance up to said object if the phase difference between said modulated light and said reflected light falls in a predetermined range.

19. A ranging method according to claim 18, wherein said step b) detects the reflected light with a plurality of light detectors; and said step c) calculates distances up to said object which correspond respectively to said light detectors from phase differences between said modulated light and said reflected light which correspond respectively to said light detectors, and said step of correcting the distance up to said object corrects the distance up to said object with respect to each of those of said light detectors, those of said light detectors having phase differences between said modulated light and said reflected light which fall in said predetermined range.

20. A ranging method according to claim 11, wherein said step b) comprises the step of sampling an amount of light detected in exposure periods, said exposure periods being established on the basis of a constant cyclic period with respect to a time when said modulated light starts being emitted;

wherein said step of correcting the distance up to said object calculates an offset component by subtracting the total amount of the reflected light from the total amount of light detected in a certain period, and corrects the distance up to said object in view of said offset component.

* * * * *